(12) United States Patent
Dorwin

(10) Patent No.: US 8,751,800 B1
(45) Date of Patent: Jun. 10, 2014

(54) DRM PROVIDER INTEROPERABILITY

(75) Inventor: David Kimbal Dorwin, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/437,789

(22) Filed: Apr. 2, 2012

Related U.S. Application Data

(60) Provisional application No. 61/569,755, filed on Dec. 12, 2011.

(51) Int. Cl.
*H04L 29/06* (2006.01)

(52) U.S. Cl.
USPC ........... 713/167; 713/160; 713/165; 713/169; 713/172; 713/175; 713/185; 380/277

(58) Field of Classification Search
USPC ........................................................ 713/167
See application file for complete search history.

(56) References Cited

U.S. PATENT DOCUMENTS

| | | | |
|---|---|---|---|
| 4,535,355 A | 8/1985 | Arn et al. | |
| 4,694,489 A | 9/1987 | Frederiksen | |
| 5,134,656 A | 7/1992 | Kudelski | |
| 5,144,663 A | 9/1992 | Kudelski et al. | |
| 5,191,611 A | 3/1993 | Lang | |
| 5,339,413 A | 8/1994 | Koval et al. | |
| 5,375,168 A | 12/1994 | Kudelski | |
| 5,392,351 A | 2/1995 | Hasebe et al. | |
| 5,487,167 A | 1/1996 | Dinallo et al. | |
| 5,539,450 A | 7/1996 | Handelman | |
| 5,590,200 A | 12/1996 | Nachman et al. | |
| 5,592,212 A | 1/1997 | Handelman | |
| 5,621,799 A | 4/1997 | Katta et al. | |

(Continued)

FOREIGN PATENT DOCUMENTS

| EP | 0658054 A2 | 6/1995 |
|---|---|---|
| EP | 0714204 A2 | 5/1996 |

(Continued)

OTHER PUBLICATIONS

"Establishing Interconnectivity among Various Makers' Products through Standardization of VOD Protocol", NTT Corporation Press Release, Sep. 27, 2002 http://www.ntt.co.jp/news/news/02e/0209/020927.html.

(Continued)

*Primary Examiner* — Ashok Patel
*Assistant Examiner* — Gary Gracia
(74) *Attorney, Agent, or Firm* — Fenwick & West LLP

(57) ABSTRACT

Embodiments are directed towards providing interoperability by establishing a trust relationship between a provider of a media player usable by a consumer and a content provider. A trust relationship is verified through using a public-private key certification authority. When a request for content is received from a consumer, the request might indicate what content protection mechanisms are available in the consumer's device. When a trust relationship is determined to exist between the content provider and the media player providers, the content provider encrypts a license separately for each of a plurality of different content protection mechanisms available at the consumer's device. The encrypted licenses are provided to the consumer's device, where the media player may be selected to play the content based on a self integrity check the media player may perform, and its ability to use a private key associated with a corresponding public key to decrypt the license.

20 Claims, 8 Drawing Sheets

(56) References Cited

U.S. PATENT DOCUMENTS

| | | | |
|---|---|---|---|
| 5,640,546 A | 6/1997 | Gopinath et al. | |
| 5,666,412 A | 9/1997 | Handelman et al. | |
| 5,684,876 A | 11/1997 | Pinder et al. | |
| 5,758,257 A | 5/1998 | Herz et al. | |
| 5,774,527 A | 6/1998 | Handelman et al. | |
| 5,774,546 A | 6/1998 | Handelman et al. | |
| 5,799,089 A | 8/1998 | Kuhn et al. | |
| 5,805,705 A | 9/1998 | Gray et al. | |
| 5,870,474 A | 2/1999 | Wasilewski et al. | |
| 5,878,134 A | 3/1999 | Handelman et al. | |
| 5,883,957 A | 3/1999 | Moline et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,625 A | 7/1999 | Davies | |
| 5,920,861 A | 7/1999 | Hall et al. | |
| 5,922,208 A | 7/1999 | Demmers | |
| 5,923,666 A | 7/1999 | Gledhill et al. | |
| 5,933,498 A | 8/1999 | Schneck et al. | |
| 5,939,975 A | 8/1999 | Tsuria et al. | |
| 5,943,422 A | 8/1999 | Van Wie et al. | |
| 5,949,876 A | 9/1999 | Ginter et al. | |
| 5,982,891 A | 11/1999 | Ginter et al. | |
| 5,991,399 A | 11/1999 | Graunke et al. | |
| 6,009,116 A | 12/1999 | Bednarek et al. | |
| 6,009,401 A | 12/1999 | Horstmann | |
| 6,009,525 A | 12/1999 | Horstmann | |
| 6,021,197 A | 2/2000 | von Willich et al. | |
| 6,035,037 A | 3/2000 | Chaney | |
| 6,038,433 A | 3/2000 | Vegt | |
| 6,049,671 A | 4/2000 | Slivka et al. | |
| 6,055,503 A | 4/2000 | Horstmann | |
| 6,073,256 A | 6/2000 | Sesma | |
| 6,112,181 A | 8/2000 | Shear et al. | |
| 6,138,119 A | 10/2000 | Hall et al. | |
| 6,141,753 A | 10/2000 | Zhao et al. | |
| 6,157,721 A | 12/2000 | Shear et al. | |
| 6,160,891 A | 12/2000 | Al-Salqan | |
| 6,178,242 B1 | 1/2001 | Tsuria | |
| 6,185,683 B1 | 2/2001 | Ginter et al. | |
| 6,189,097 B1 | 2/2001 | Tycksen, Jr. et al. | |
| 6,191,782 B1 | 2/2001 | Mori et al. | |
| 6,226,618 B1 | 5/2001 | Downs et al. | |
| 6,226,794 B1 | 5/2001 | Anderson, Jr. et al. | |
| 6,237,786 B1 | 5/2001 | Ginter et al. | |
| 6,240,185 B1 | 5/2001 | Van Wie et al. | |
| 6,247,950 B1 | 6/2001 | Hallam et al. | |
| 6,253,193 B1 | 6/2001 | Ginter et al. | |
| 6,256,668 B1 | 7/2001 | Slivka et al. | |
| 6,272,636 B1 | 8/2001 | Neville et al. | |
| 6,285,985 B1 | 9/2001 | Horstmann | |
| 6,292,569 B1 | 9/2001 | Shear et al. | |
| 6,298,441 B1 | 10/2001 | Handelman et al. | |
| 6,311,221 B1 | 10/2001 | Raz et al. | |
| 6,314,409 B2 | 11/2001 | Schneck et al. | |
| 6,314,572 B1 | 11/2001 | LaRocca et al. | |
| 6,334,213 B1 | 12/2001 | Li | |
| 6,363,488 B1 | 3/2002 | Ginter et al. | |
| 6,385,596 B1 | 5/2002 | Wiser et al. | |
| 6,389,402 B1 | 5/2002 | Ginter et al. | |
| 6,405,369 B1 | 6/2002 | Tsuria | |
| 6,409,080 B2 | 6/2002 | Kawagishi | |
| 6,409,089 B1 | 6/2002 | Eskicioglu | |
| 6,415,031 B1 | 7/2002 | Colligan et al. | |
| 6,427,140 B1 | 7/2002 | Ginter et al. | |
| 6,449,367 B2 | 9/2002 | Van Wie et al. | |
| 6,449,719 B1 | 9/2002 | Baker | |
| 6,459,427 B1 | 10/2002 | Mao et al. | |
| 6,466,670 B1 | 10/2002 | Tsuria et al. | |
| 6,505,299 B1 | 1/2003 | Zeng et al. | |
| 6,587,561 B1 | 7/2003 | Sered et al. | |
| 6,618,484 B1 | 9/2003 | Van Wie et al. | |
| 6,629,243 B1 | 9/2003 | Kleinman et al. | |
| 6,633,918 B2 | 10/2003 | Agarwal et al. | |
| 6,634,028 B2 | 10/2003 | Handelman | |
| 6,640,304 B2 | 10/2003 | Ginter et al. | |
| 6,651,170 B1 | 11/2003 | Rix | |
| 6,654,420 B1 | 11/2003 | Snook | |
| 6,654,423 B2 | 11/2003 | Jeong et al. | |
| 6,658,568 B1 | 12/2003 | Ginter et al. | |
| 6,668,325 B1 | 12/2003 | Collberg et al. | |
| 6,792,113 B1 | 9/2004 | Ansell et al. | |
| 7,007,170 B2 | 2/2006 | Morten | |
| 7,165,175 B1 | 1/2007 | Kollmyer et al. | |
| 7,356,143 B2 | 4/2008 | Morten | |
| 7,640,435 B2 | 12/2009 | Morten | |
| 7,805,616 B1* | 9/2010 | Mohammed et al. | 713/189 |
| 7,817,608 B2 | 10/2010 | Rassool et al. | |
| 7,953,882 B2 | 5/2011 | Shukla et al. | |
| 2002/0001385 A1 | 1/2002 | Kawada et al. | |
| 2002/0015498 A1 | 2/2002 | Houlberg et al. | |
| 2002/0021805 A1 | 2/2002 | Schumann et al. | |
| 2002/0049679 A1 | 4/2002 | Russell et al. | |
| 2002/0089410 A1 | 7/2002 | Janiak et al. | |
| 2002/0104004 A1 | 8/2002 | Couillard | |
| 2002/0141582 A1 | 10/2002 | Kocher et al. | |
| 2003/0007568 A1 | 1/2003 | Hamery et al. | |
| 2003/0046568 A1 | 3/2003 | Riddick et al. | |
| 2004/0054909 A1* | 3/2004 | Serkowski et al. | 713/176 |
| 2004/0117500 A1 | 6/2004 | Lindholm et al. | |
| 2004/0151315 A1 | 8/2004 | Kim | |
| 2004/0184616 A1 | 9/2004 | Morten | |
| 2005/0193205 A1 | 9/2005 | Jacobs et al. | |
| 2005/0273862 A1 | 12/2005 | Benaloh et al. | |
| 2006/0280150 A1* | 12/2006 | Jha et al. | 370/338 |
| 2007/0160208 A1 | 7/2007 | MacLean et al. | |
| 2007/0209005 A1 | 9/2007 | Shaver et al. | |
| 2007/0219917 A1* | 9/2007 | Liu et al. | 705/59 |
| 2007/0294170 A1 | 12/2007 | Vantalon et al. | |
| 2008/0027871 A1* | 1/2008 | Seo | 705/59 |
| 2008/0147671 A1 | 6/2008 | Simon et al. | |
| 2008/0155673 A1* | 6/2008 | Jung et al. | 726/7 |
| 2008/0313264 A1* | 12/2008 | Pestoni | 709/202 |
| 2009/0007198 A1 | 1/2009 | Lavender et al. | |
| 2009/0031408 A1* | 1/2009 | Thom et al. | 726/9 |
| 2009/0044008 A1 | 2/2009 | Lim | |
| 2009/0183001 A1 | 7/2009 | Lu et al. | |
| 2009/0208016 A1* | 8/2009 | Choi et al. | 380/277 |
| 2009/0249426 A1 | 10/2009 | Aoki et al. | |
| 2010/0023760 A1* | 1/2010 | Lee et al. | 713/158 |
| 2010/0027974 A1* | 2/2010 | Ansari | 386/124 |
| 2010/0145794 A1* | 6/2010 | Barger et al. | 705/14.45 |
| 2010/0180289 A1* | 7/2010 | Barsook et al. | 725/29 |
| 2010/0211776 A1* | 8/2010 | Gunaseelan et al. | 713/165 |
| 2010/0242097 A1 | 9/2010 | Hotes et al. | |
| 2010/0299701 A1 | 11/2010 | Liu et al. | |
| 2011/0055904 A1* | 3/2011 | Tsutsumi | 726/4 |
| 2011/0179283 A1* | 7/2011 | Thom et al. | 713/185 |
| 2011/0225417 A1 | 9/2011 | Maharajh et al. | |
| 2011/0251992 A1* | 10/2011 | Bethlehem et al. | 707/610 |
| 2011/0314284 A1* | 12/2011 | Chou | 713/169 |
| 2012/0066494 A1* | 3/2012 | Lee et al. | 713/160 |
| 2012/0117183 A1* | 5/2012 | Wong et al. | 709/217 |
| 2012/0173884 A1 | 7/2012 | Patil | |
| 2012/0317414 A1 | 12/2012 | Glover | |
| 2012/0331293 A1 | 12/2012 | Ma et al. | |
| 2013/0072126 A1 | 3/2013 | Topaltzas et al. | |
| 2013/0097302 A9 | 4/2013 | Khedouri et al. | |
| 2013/0108245 A1* | 5/2013 | Yin et al. | 386/291 |
| 2014/0032350 A1* | 1/2014 | Biswas et al. | 705/26.3 |

FOREIGN PATENT DOCUMENTS

| | | |
|---|---|---|
| EP | 0852445 A2 | 7/1998 |
| EP | 0886409 A2 | 12/1998 |
| EP | 1134977 A1 | 9/2001 |
| EP | 1246463 A2 | 10/2002 |
| JP | 03203432 A | 9/1991 |
| JP | 08335040 | 12/1996 |
| JP | 10336128 A | 12/1998 |
| JP | 11175475 A | 7/1999 |
| JP | 2000022680 A | 1/2000 |
| JP | 2000196585 A | 7/2000 |

(56) References Cited

FOREIGN PATENT DOCUMENTS

| | | |
|---|---|---|
| JP | 2000293945 A | 10/2000 |
| JP | 2001251599 A | 9/2001 |
| WO | 96/06504 A1 | 2/1996 |
| WO | 96/32702 A1 | 10/1996 |
| WO | 99/21364 A1 | 4/1999 |
| WO | 99/28842 A1 | 6/1999 |
| WO | 99/30409 A1 | 6/1999 |
| WO | 99/54453 A1 | 10/1999 |
| WO | 01/35571 A1 | 5/2001 |
| WO | 01/93212 A2 | 12/2001 |
| WO | 02/21761 A2 | 3/2002 |
| WO | 2004/002112 A1 | 12/2003 |

OTHER PUBLICATIONS

"High-bandwidth Digital Content Protection," Wikipedia, the free encyclopedia, last modified Nov. 14, 2012, 7 pages http://en.wikipedia.org/w/index.php?title=High-bandwidth_Digital_Content_Protection&printable=yes.

"Irdeto Access and Optibase create Strategic Alliance", Press Release, Optibase, Dec. 14, 2000, pp. 1-2 http://www.optibase.com/html/news/December_14_2000.html.

"Irdeto Access and Optibase create Strategic Alliance", Press Release, Irdeto Access, Dec. 14, 2000 pp. 1-4 http://www.irdetoaccess.com/press/0000041.htm.

"Scalable Video Coding," Wikipedia, the free encyclopedia, last modified Sep. 10, 2012, 4 pages http://en.wikipedia.org/w/index.php?title=Scalable_Video_Coding&printable=yes.

International Search Report and Written Opinion for International Patent Application No. PCT/US07/62055 mailed Sep. 11, 2007.

"What is HDCP (high definition copy protocol)?" Digital Connection, 2005, 2 pages http://www.digitalconnection.com/FAQ/HDTV_12.asp.

Balthrop, J. et al., "Coverage and Generalization in an Artificial Immune System", Proceedings of Genetic and Evolutionary Computation Conference (GECCO), 2002, pp. 1-8.

Blumenfeld, S. M., "Streaming Media—System Security," Broadcast Engineering Magazine, Oct. 2001, pp. 1-2.

Canadian Examiner Report for Application No. 2,559,323 mailed May 6, 2008, 3 pages.

Cheng, H. et al., "Partial Encryption of Compressed Images and Videos", IEEE Transactions on Signal Processing, vol. 48, No. 8, Aug. 2000, pp. 2439-2451.

Cheng, H. C. H., "Partial Encryption for Image and Video Communication", Department of Computing Science, University of Alberta, Fall 1998, pp. 1-87.

Deitcher, D., "Secure implementations of Content Protection (DRM) Schemes on Consumer Electronic Devices," Discretix, White Paper, May 2011, 17 pages.

Eskicioglu, A. M. et al., "An Overview of Multimedia Content Protection in Consumer Electronics Devices", SP:IC, vol. 16 No. 7, Apr. 2001, pp. 691-699.

Search Report for European Patent Application No. 05250968.4 mailed Oct. 12, 2005.

Ferrill, E. et al., "A Survey of Digital Watermarking", Feb. 25, 1999, 15 pages http://elizabeth.ferrill.com/papers/watermarking.pdf.

Forrest, S., "Research Projects," Dec. 2, 2003, pp. 1-3 http://www.cs.unm.edu/.about.forrest/projects.html.

Goodman, J. et al., "Low Power Scalable Encryption for Wireless Systems", Wireless Networks, No. 4, 1998, pp. 55-70.

Griwodz, C. et al., "Protecting VoD the Easier Way", ACM Multimedia, Bristol, UK, Jan. 1998, pp. 21-28.

Griwodz, C., "Video Protection by Partial Content Corruption", Multimedia and Security Workshop at ACM Multimedia, Bristol, UK, Sep. 1998, pp. 1-5.

Hunter, J., et al., "A Review of Video Streaming Over the Internet", DSTC Technical Report TR97-10, Aug. 1997, pp. 1-28.

"Intelligent Systems for Finance and Business," Goonatilake, S. et al., eds., Chapters 2-10, 1995, pp. 31-173.

Kirovski, D. et al, "Digital Rights Management for Digital Cinema", Proceedings of the SPIE, Bellingham, VA, vol. 4472, Jul. 31, 2001, p. 105-120.

Office Action for European Patent Application No. 05250968.4 mailed Jan. 26, 2006.

Omneon Video Networks Product Announcement, "Broadband Streaming—Omneon and BSkyB", TB-1006-1, created 2002, pp. 1-4.

Schulzrinne, H., et al., "RTP: A Transport Protocol for Real-Time Applications", RFC 1889, Jan. 1996, pp. 1-75.

Schulzrinne, H., et al., "Real Time Streaming Protocol (RTSP)," RFC 2326, Apr. 1998, pp. 1-86.

Spanos, G. et al., "Performance Study of a Selective Encryption Scheme for the Security of Networked, Real-Time Video", Proceedings of the Fourth International Conference on Computer Communications and Networks, ICCCN '95, Las Vegas, NV, Sep. 1995, pp. 2-10.

Supplementary European Search Report for European Patent Application No. 00986215 dated Nov. 14, 2005.

Supplementary European Search Report for European Patent Application No. 04757582.4 mailed Nov. 20, 2006.

Teixeira, L. M. et al, "Secure Transmission of MPEG Video Sources", Proceedings of IEEE Workshop on ISPACS, Nov. 6, 1998, pp. 1-5.

Wu, T.-L. et al., "Selective Encryption and Watermarking of MPEG Video (Extended Abstract)", submitted to International Conference on Image Science, Systems, and Technology, Feb. 17, 1997, 10 pages.

Yoshida, K. et al., "A Continuous-Media Communication Method for Minimizing Playback Interruptions", IS&T/SPIE Conference on Visual Communications and Image Processing, San Jose, California, vol. 3653, Jan. 1999, 10 pages.

Zhang, J. et al., "A Flexible Content Protection System for Media-On-Demand", Proceedings of the Fourth International Symposium on Multimedia Software Engineering 2002, Dec. 11-13, 2002, Piscataway, NJ, Dec. 11, 2002, pp. 272-277.

Official Communication for European Patent Application No. 04757582.4 mailed May 22, 2007.

Official Communication for Chinese Patent Application No. 2004800071571 mailed Apr. 13, 2007.

"A new approach to browser security: the Google Chrome Sandbox," Chromium Blog, http://blog.chromium.org/2008/10/new-approach-to-browser-security-google.html, 5 pages, Oct. 2, 2008.

"Conditional access," Wkipedia, the free encyclopedia, http://en.wikipedia.org/wiki/Conditional_access, 8 pages, created Jul. 7, 2005.

"Encrypted Media Extensions, W3C Editor's Draft Dec. 17, 2012," W3C, http://dvcs.w3.org/hg/html-media/raw-file/tip/encrypted-rnedia/encrypted-media.html, 32 pages, created Feb. 22, 2012, current draft dated Dec. 17, 2012.

"Getting Started: Background and Basics—The Chromium Projects," http://chromium.org/nativeclient/getting-started/getting-started-background-and-basics, 4 pages, Sep. 2, 2008.

"Google Native Client," Wikipedia, the free encyclopedia, http://en.wikipedia.org/wiki/Google_Native_Client, 6 pages, created Dec. 9, 2008.

"HTML5," Wikipedia, the free encyclopedia, http://en.wikipedia.org/wiki/HTML5, 9 pages, created Nov. 16, 2006.

"Media Source Extensions, W3C Editor's Draft Dec. 18, 2012," http://dvcs.w3.org/hg/html-media/raw-file/tip/media-source/media-source.html, 25 pages, created Jul. 11, 2011, current draft dated Dec. 18, 2012.

"Media Source Extensions," http://html5-mediasource-api.googlecode.com/svn/trunk/draft-spec/mediasource-draft-spec.html, 1 page, Jul. 11, 2011.

"MediaSource Extensions v0.3," editor A. Colwell, http://html5-mediasource-api.googlecode.com/svn/tags/0.3/draft-spec/mediasource-draft-spec.html, 14 pages, Mar. 13, 2012.

"Multimedia over Coax Alliance," Wikipedia, the free encyclopedia, http://en.wikipedia.org/wiki/Multimedia_over_Coax_Alliance, 4 pages, created Jun. 11, 2006.

"Sandbox—The Chromium Projects," http://dev.chromium.org/developers/design-documents/sandbox, 8 pages, Sep. 2, 2008.

(56) References Cited

OTHER PUBLICATIONS

"W3C HTML Working Group," http://www.w3.org/html/wg, 9 pages, 2007.

"Web Cryptography Working Group Charter," W3C Technology and Society domain, http://www.w3.org/2011/11/webcryptography-charter.html, 6 pages, Apr. 3, 2012.

Barth, A. et al., "The Security Architecture of the Chromium Browser," Technical Report, Stanford University, 2008.

Glazkov, D., "What the Heck is Shadow DOM?," http://glazkov.com/2011/01/14/what-the-heck-is-shadow-dom, 14 pages, Jan. 14, 2011.

Metz, C., "Google Native Client: The web of the future—or the past?" The Register, http://www.theregister.co.uk/2011/09/12/google_native_client_from_all_sides/print.html, 13 pages, Sep. 12, 2011.

Yee, B. et al., "Native Client: A Sandbox for Portable, Untrusted x86 Native Code," IEEE Symposium on Security and Privacy, Oakland 2009, 15 pages, May 16-19, 2009.

"Digital rights management," Wikipedia, the free encyclopedia, last modified Mar. 30, 2012, 30 pages http://en.wikipedia.org/w/index.php?title=Digital_rights_management&printable=yes.

"PlayReady," Wikipedia, the free encyclopedia, last modified Jan. 30, 2012, 2 pages http://en.wikipedia.org/w/index.php?title=PlayReady&printable=yes.

"UltraViolet (system)," Wikipedia, the free encyclopedia, last modified Feb. 20, 2012, 5 pages. http://en.wikipedia.org/w/index.php?title=UltraViolet_(system)&printable=yes.

Colwell, A., "Proposal for a MediaSource API that allows sending media data to a HTMLMediaElement," Jul. 11, 2011, pp. 1-11 http://lists.whatwg.org/pipermail/whatwg-whatwg.org/2011-Jul./032384.html.

Official Communication for U.S. Appl. No. 13/532,734 mailed Oct. 23, 2013.

Official Communication for U.S. Appl. No. 13/654,237 mailed Oct. 23, 2013.

Official Communication for U.S. Appl. No. 13/654,271 mailed Oct. 24, 2013.

Official Communication for U.S. Appl. No. 13/712,764 mailed Nov. 7, 2013.

Official Communication for U.S. Appl. No. 13/586,664 mailed Dec. 26, 2013.

Official Communication for U.S. Appl. No. 13/586,664, mailed Jun. 20, 2013.

\* cited by examiner

DRM PROVIDER INTEROPERABILITY

CROSS-REFERENCE TO RELATED APPLICATION

This application is a utility patent application based on previously filed U.S. Provisional Patent Application Ser. No. 61/569,755 filed on Dec. 12, 2011, the benefit of which is hereby claimed under 35 U.S.C. §119(e) and incorporated herein by reference.

TECHNICAL FIELD

The present embodiments relate generally to enabling access to protected content and, more particularly, but not exclusively, to using a trust relationship between a content provider and one or media player/content decryption module (CDM) providers to determine whether to send a license/decryption key to a client device having a media player/CDM from the media player/CDM provider to allow access to protected content.

BACKGROUND

Today, there is a concern by many individuals and organizations to protect their rights to media content that they produce from improper copying, and/or distribution. At least some of these concerns arise in part because these individuals and/or organizations are at least in part dependent upon revenue generated from their media content. Such media content may include virtually any format or form, including songs, videos, images, documents, games, books, articles, and/or other audio content, to name just a few examples of media content that some parties may wish to protect.

One class of solutions that has been implemented to attempt to address this concern is known as Digital Rights Management (DRM). Briefly, DRM is intended to provide access control technologies used by publishers, copyright holders, and others to control their media content after it is given to a consumer, from improper access, copying, and/or distribution.

However, there are a large number of these DRM solutions available and in use by various media content distributors, media player manufacturers, and so forth. Many of these DRM solutions are not interoperable, meaning at least that a consumer's device/platform may need to include multiple DRM solutions, depending upon what solution is used to protect the media content that consumer desires to access. This may require a consumer to have to manage multiple solutions. However, where the consumer's player is a hardware solution, the consumer may be constrained to a single DRM solution obtained from the hardware manufacturer. This may mean that the consumer may be unable to play content that is protected using a different DRM solution than the one implemented by the hardware manufacturer. Thus, there is a desire to address at least the issue of media content protection interoperability. Therefore, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

Figure 1:
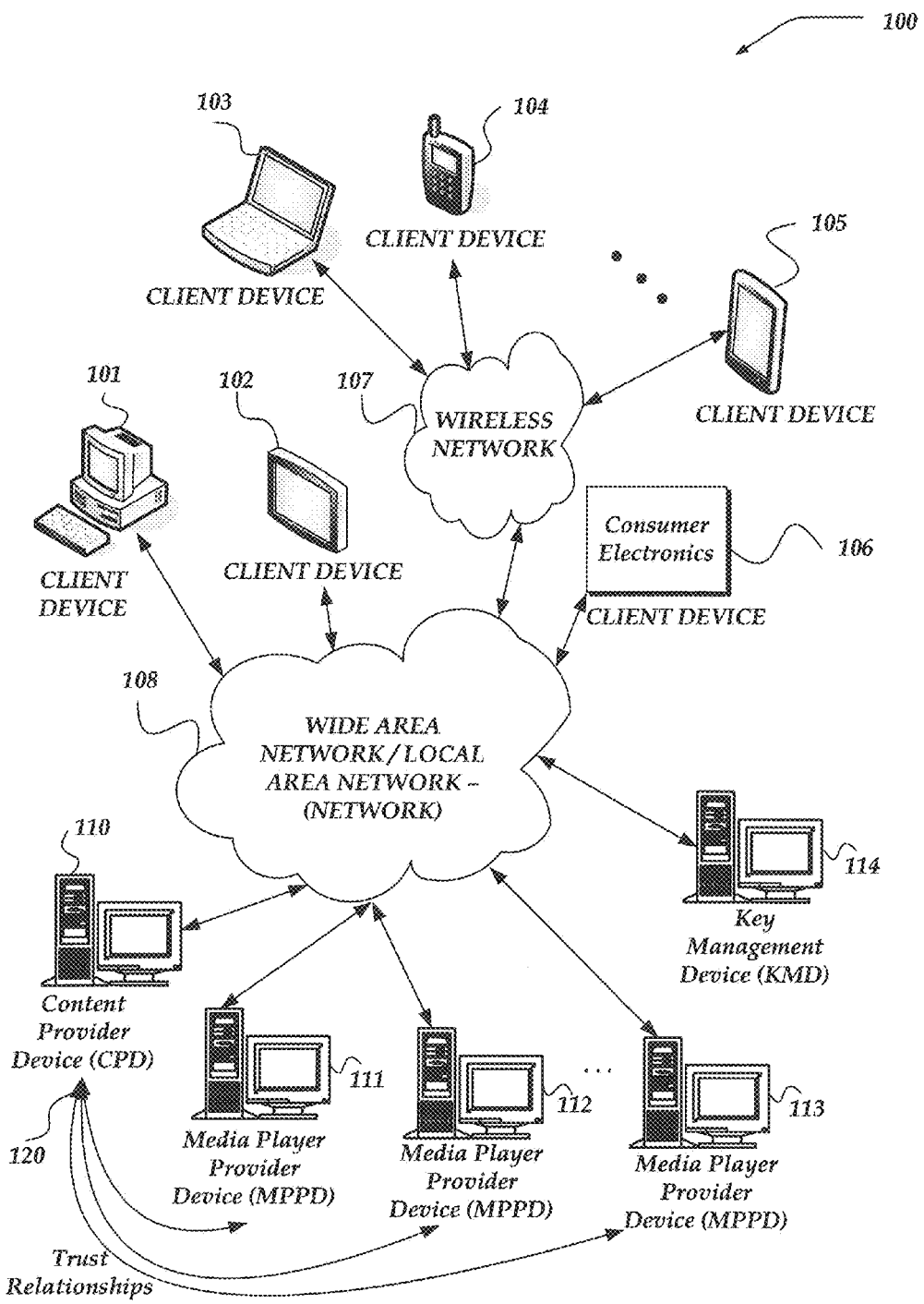
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" includes any digital data that may be communicated over a network to be remotely played by a computing device. Non-exhaustive examples of content include but are not limited to movies, videos, music, spoken word, pictures, illustrations, graphics, images, text, and the like. Content is often described by its format, or container, in which the content is provided. Thus, as used here, the term "container" refers to a data stream or file format which encapsulates audio and visual content. This content often consists of interleaved audio and video data in frames, with accompanying metadata such as frame timing information, audio and/or video configuration information, encoding information, compression information, and the like. Also, the container is typically arranged to enable content to be presented for playback at a remotely located network device, such as a client device. A container may also be named a "systems stream". A non-limiting and non-exhaustive list of examples of container/system streams formats are: MPEG2-TS (Moving Picture Experts Group ("MPEG") transport stream ("TS")), flash video ("FLV"), MOV (a QuickTime file format), MP4, 3 GP, and ASF (Advanced Systems Form), WebM Project file format, Matroska multimedia container format, or the like. A video encoding format, such as H.264, VP8, or the like, may be encapsulated in the container. The content may be distributed as a rights managed systems stream of data over a network such as Pay Per View (PPV), Video On Demand (VoD), live streaming, or the like for playback by a remote network device. In one embodiment, the content may be protected through a license that describes how, where, when, by whom, or so forth, content that is protected may be accessed, distributed, copied, or the like. Protected content may be protected using a variety of content protection mechanisms.

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards addressing media content interoperability issues by having content providers and/or their selected DRM provider establish a trust relationship with a provider of a media player and/or content decryption module (CDM) provider usable by a consumer. In one embodiment, this trust relationship may be established at virtually any level, including at the media player/CDM provider level, for all versions of media player/CDM that the provider provides, or at a per version level for each version of a media player/CDM, or even based on configuration/capabilities (even within a same version). Moreover, the trust relationship may be established based on a third-party evaluation of the provider and/or version of media player/CDM, including a test result by a third-party, by a status of a certificate from a certification third-party, or any of a variety of other mechanisms. In one embodiment, the trust relationship may be verified, and/or revised through use of a Public-private key certification authority (CA) that provides and/or revokes public/private key certificates. For example, a revoked certificate might indicate that the trust relationship should not be established by the content provider for a particular version of media player/CDM.

When a request is received from a client device for access to protected content, the request might include a request for a license and/or a content decryption key to access the protected content. The license may indicate under what terms or conditions the protected content may be accessed, played, copied, and/or distributed, while the content decryption key is directed to enabling decryption of at least a portion of the protected content. It is noted that the content may be protected under multiple content decryption keys, and/or multiple licenses. In one embodiment, the request may include indication of what content protection mechanisms (e.g., content decryption modules—CDMs) are available in the consumer's device. In another embodiment, the content provider or its DRM provider may send a request to the consumer's player/device to request what content protection mechanisms (e.g., CDMs) are supported. In any event, the content provider/DRM provider may determine whether a trust relationship is established for one or more media players and/or versions of media players employing the supported CDM(s). When a trust relationship is determined to exist, the content provider/DRM provider may use the trust relationship to access a public key that is associated with the trusted media player and/or version of media player, for use with the one or more trusted CDMs. The content provider/DRM provider then may encrypt a license and/or decryption key(s) using the public key. In one embodiment, the license/decryption key(s) may be encrypted separately for a plurality of different content protection mechanisms (CDMs), based on what content protection mechanisms the consumer's device includes, or for those mechanisms the content provider/DRM provider has established trust relationships. The encrypted licenses/decryption keys may then be provided to the consumer's device. As used herein, the phrases "license(s)/decryption key(s)," "license/decryption key(s)," or similar, are not to be construed as indicating that one or more license and one or more decryption keys are managed, encrypted, or otherwise jointly requested and/or sent. Thus, the, "/" herein indicates one or more licenses, one or more decryption keys, or one or more licenses and one or more decryption keys.

In one embodiment, the client device may include a plurality of media players/CDM, and/or versions of media players/CDM. In one embodiment, the media players may be designed to verify an integrity of the consumer's device, and/or an integrity of the media player itself, as well as the supported/used CDM for that media player version. In another embodiment, the employed CDM(s) may perform these integrity verifications, including upon itself. When the integrity is verified, the media player may then enable access to a private key corresponding to the public key, and use the private key corresponding to the public key used to encrypt the license/decryption key(s). Access to the protected content is then made available under the rights/constraints identified at least through the decrypted license and/or decryption keys. In at least one embodiment, it is recognized that a format of the license is understood by the consumer's device and/or the format of the license is a commonly recognized license format.

By establishing a trust relationship at the content provider and media player level (and/or CDM level), a plurality of public/private keys for a plurality of different DRM or other content protection mechanisms may be made available to the consumer's device. This enables the client device to select and decrypt a license using any of its content protection mechanisms.

In one embodiment, the trust is moved out of the client device, in a novel way, placing the trust requirements upon the content provider and/or its representatives (e.g., media player providers and/or CDM providers). Moreover, the consumer's device may be provided a plurality of different ways of accessing the protected content, and thereby is not constrained to a limited solution. Thus, the consumer's device becomes interoperable over a variety of content protection solutions.

While various embodiments disclosed herein discuss protected media content, it should be noted that the embodiments may also be employed for virtually any application where a client device is typically used to establish a trust relationship with a service provider, and a content provider. For example, one application might include deciding whether a device, such as a cable box, mobile phone, or the like, is allowed to access and/or otherwise communicate over a network with another device.

Further, as is discussed above, and elsewhere herein, the trust relationship may also be established between the content provider and a content decryption module (CDM) provider, in addition to, and/or instead of a media player provider. Thus, as used herein, such trust relationship discussions between the content provider/DRM provider and a media player provider is to include trust relationships between the content provider/DRM provider and a CDM provider, as well.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 108, wireless network 107, client devices 101-106, Content Provider Device ("CPD") 110, Media Player Provider Devices (MPPDs) 111-113, and Key Management Device (KMD) 114.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device usable as a video display device, such as a television, display monitor, display screen, projected screen, and the like. Additionally, client device 106 may include any kind of Consumer Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, accessing and/or playing content, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 101-106 typically range widely in terms of capabilities and features.

A web-enabled client device may include a browser application that is configured to receive and to send web pages, web-based messages, and the like. The browser application may be configured to receive and display graphics, text, multimedia, media content, and the like, employing virtually any internet based and/or network-based protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Audio Language ("HTML"), eXtensible Markup Language ("XML"), and the like, to display and send a message. In one embodiment, a user of a client device may employ the browser application to perform various activities over a network (online). However, another application may also be used to perform various online activities.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may identify themselves as part of a class of devices. In another embodiment, client devices 101-106 may uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, CPD 110, MPPDS 111-113, or other computing devices. Moreover, it should be readily understood that devices and/or components within a device that is communicating with a client device may also identify themselves using any of a variety of mechanisms, including those used by the client device.

Client devices 101-106 may further be configured to include a client application that enables an end-user to log into an end-user account that may be managed by another computing device, such as CPD 110, MPPDS 111-113, or the like. Such end-user account, in one non-limiting example, may be configured to enable the end-user to manage one or more online activities, including in one non-limiting example, search activities, social networking activities, browse various websites, communicate with other users, or the like. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2 G), 3rd (3 G), 4th (4 G) generation radio access for cellular systems, WLAN, Wireless Router ("WR") mesh, and the like. Access technologies such as 2 G, 3 G, 4 G and future access networks may enable wide area coverage for mobile devices, such as client devices 101-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, network device CPD 110, network devices MPPDS 111-113, and through wireless network 107 to client devices 103-105. Network 108 is enabled to employ any form of network mechanism for communicating information from one electronic device to another. Also, network 108 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

One embodiment of CPD 110 is described in more detail below in conjunction with FIG. 3. Briefly, however, CPD 110 includes virtually any network device usable to operate as a content server to connect to network 108 to provide content to client devices 101-106. In some embodiments, CPD 110 may identify available versions of user selected content and generate separate video and audio content.

It should be readily recognized that CPD 110 is configured to operate on behalf of a content owner, distributor, or similar business entity. However, while used herein to represent such network devices useable to provide content, it is further recognized that other devices may also be employed. For example, a content provider may employ a Content Distribution Network Device that operates on behalf of the content provider to provide content. Thus, other configurations and variations of devices serving content are also envisaged, and other embodiments are not constrained to a single configuration/arrangement of devices.

CPD 110 may also manage various trust relationships 120 with one or more MPPDs 111-113. In one embodiment, a third-party may evaluate a quality and/or integrity of one or more versions of media players provided by an MPPD. Then based on a result of the evaluation, CPD 110 may elect to establish a trust relationship with the evaluated MPPD. In one embodiment, the evaluations may be performed using any of a variety of mechanisms, including testing by the third-party, or the like. In one embodiment, testing and test results may be provided by a MPPD to the third-party, which may in turn provide an evaluation of the testing and/or test results to CPD 110. In still another embodiment, the third-party may provide information to a Key Management Device 114, or similar Certification Authority indicating that the tested MPPD may be trusted, a particular version of media player may be trusted, and/or a particular content decryption module (CDM) provided by the MPPD, or a similar entity may be trusted.

In any event, CPD 110 may elect to establish a trust relationship with one or more MPPDs 111-113. Then, when a request is received by one of client devices 101-106 to access protected content, CPD 110 may access a public key corresponding to at least one of the trust relationships from Key Management Device (KMD) 114. The public key may then be used by CPD 110 to encrypt a license and/or decryption key(s) associated with the requested protected content. The encrypted license/decryption key(s) may then be provided to the requesting client device for use in decrypting and/or accessing the protected content. Moreover, CPD 110 may employ processes such as described in more detail below in conjunction with FIGS. 6-7 to perforin at least some of these actions.

Further, while KMD 114 is disclosed herein, other mechanisms may also be employed for providing access to public keys. For example, the keys may be provided offline, directly from one or more of the MPPDs, or any of a variety of other ways, wherein CPD 110 is provided confidence in the association of the public key to an ownership/use of a corresponding private key. For example, should the public/private keys be generated within a content decryption module, then the content decryption module could also provide the public keys to one or more CPDs. Again, as noted above, while the term CPD is disclosed, such usage also encompasses any representative of CPD operating on their behalf to provide content, manage trust relationships, or the like.

Devices that may operate as CPD 110 include various network devices, including, but not limited to personal computers, desktop computers, multiprocessor systems, microprocessor-based or programmable consumer electronics, network PCs, server devices, network appliances, and the like.

Although FIG. 1 illustrates CPD 110 as a single computing device, the invention is not so limited. For example, one or more functions of CPD 110 may be distributed across one or more distinct network devices. Moreover, CPD 110 is not limited to a particular configuration. Thus, in one embodiment, CPD 110 may contain a plurality of network devices to provide content, licenses, and/or decryption keys to a client device, such as client devices 101-106. Similarly, in another embodiment, CPD 110 may contain a plurality of network devices that operate using a master/slave approach, where one of the plurality of network devices of CPD 110 operates to manage and/or otherwise coordinate operations of the other network devices. In other embodiments, the CPD 110 may operate as a plurality of network devices within a cluster architecture, a peer-to-peer architecture, and/or even within a cloud architecture. Thus, the invention is not to be construed as being limited to a single environment, and other configurations, and architectures are also envisaged.

MPPDS 111-113 may include any network device capable of connecting to network 108 to provide media players to client devices 101-106 for use in playing content. In one embodiment, MPPDs 111-113 may provide updates, including bug fixes, version changes, or the like to the client devices of various media players. In one embodiment, the media players may be configured to include or are configured to access one or more content decryption modules (CDMs). In one embodiment, the CDMs may also be provided by MPPDs 111-113. However, in another embodiment, the CDMs may be tested, evaluated, and/or provided by another network device or network devices. However, for simplicity of FIG. 1, it may be herein assumed that MPPDs 111-113 may provide CDMs to client devices 101-106 as well as providing media players.

It should be readily recognized that MPPDs are network devices operating over the network on behalf of a media player/CDM provider. Further, it is recognized that in some embodiments, a media player and/or CDM may be already present within a client device. However, access to such media players/CDMs may have been provided at some point in time.

A media player might include such examples, as VLC media player or the like. Briefly, a media player includes virtually any software, and/or hardware that is arranged to receive content, such as video files, audio files, or the like, and enables a client device such as client devices 101-106 to play the content. In one embodiment, where the content is protected based on a license, encryption key, or the like, the media player may access, and/or include one or more CDMs.

One non-limiting, non-exhaustive example of a CDM is described in more detail below in conjunction with FIG. 4. Briefly, however, a CDM is configured to request a license, and/or decryption key(s) usable to decrypt the protected content, as appropriate, and using the license, to allow the media player selectively to access and play the decrypted content based on the license.

As discussed in more detail below, in one embodiment, the CDMs may include and/or receive a private decryption key that corresponds to a public key, where the public/private keys employ any of a variety of asymmetric key technologies. For example, the public/private keys may be generated using including, but not limited to, Diffie-Hellman, RSA, Merkle-Hellman, PGP, X.509, elliptic curve techniques, ElGamal, or the like.

In one embodiment, the CDM may receive its private key from a CDM provider, KMD 114, MPPD 111-113, or the like. In one embodiment, the private key along with its corresponding public key may be generated within a CDM. The CDM may then provide the public key to KMD 114, MPPD 111-113, or the like. In one embodiment, the CDM may protect the private key using any of a variety of mechanisms. As discussed further below, CDMs may also provide protection of received content keys, decrypted data, and/or licenses, among other items.

For example, the CDM may include various mechanisms that monitor an integrity of the CDM, the client device, media player, and/or the like. Then based on results of an integrity evaluation, the CDM may employ its private key to decrypt the license and/or decryption keys to enable access to the protected content. Should the CDM determine that the integrity has been compromised, the CDM may then actively inhibit access to the private key, destroy the private key, prevent use of the private key in decrypting a license/decryption key, or the like. In one embodiment, the CDM may elect to send a message to KMD 114, CPD 110, MPPD 111-113, or the like, indicating that the CDM's integrity is compromised.

KMD 114 represents one of a variety of network devices for managing trust relationship information, and access to public keys. In one embodiment, KMD 114 may operate to certify an ownership of a public key named within a digital certificate that provides a public key. This allows others, such as CPD 110, or the like, to rely upon signatures or assertions made by the owner that corresponds to the public key that is certified. In one embodiment, KMD 114 may then operate as a trusted third party that is trusted by CPD 110 and by MPPDs 111-113. Thus, in one embodiment, KMD 114 may operate as a Certification Authority, such as employed by many public key infrastructures (PKI) schemes. Further, KMD 114 may also provide Certificate Revocation Lists (CRLs) indicating when a public key/certificate is no longer valid, and might no longer be trusted/trustable.

In one embodiment, KMD 114 may receive a public key from any of an MPPD, CDM provider, or the like, and based on various criteria, elect to publish and make accessible the public key through a certificate that KMD 114 digitally signs.

In one embodiment, a third-party, an MPPD 111-113, CPD 110, or even a client device might provide information to KMD 114 indicating that a private key that corresponds to a public key has been compromised. KMD 114 may then elect to revoke an associated certificate for the public key and/or provide such information to others using a CRL. KMD 114 may also not offer a compromised key to a requesting device.

Devices that may operate as MPPDS 111-113, and/or KMD 114 include various network devices, including, but not limited to personal computers, desktop computers, multiprocessor systems, microprocessor-based or programmable consumer electronics, network PCs, server devices, network appliances, and the like.

Although FIG. 1 illustrates MPPDS 111-113 and KMD 114 as single computing devices, the invention is not so limited. For example, one or more functions of MPPDS 111-113 and/or KMD 114 may be distributed across one or more distinct network devices. Moreover, MPPDS 111-113 and KMD 114 are not limited to a particular configuration. Thus, in one embodiment, MPPDS 111-113 and/or KMD 114 may contain a plurality of network devices. Similarly, in another embodiment, MPPDS 111-113 may contain a plurality of network devices that operate using a master/slave approach, where one of the plurality of network devices of MPPDS 111-113 operates to manage and/or otherwise coordinate operations of the other network devices. In other embodiments, the MPPDS 111-113 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
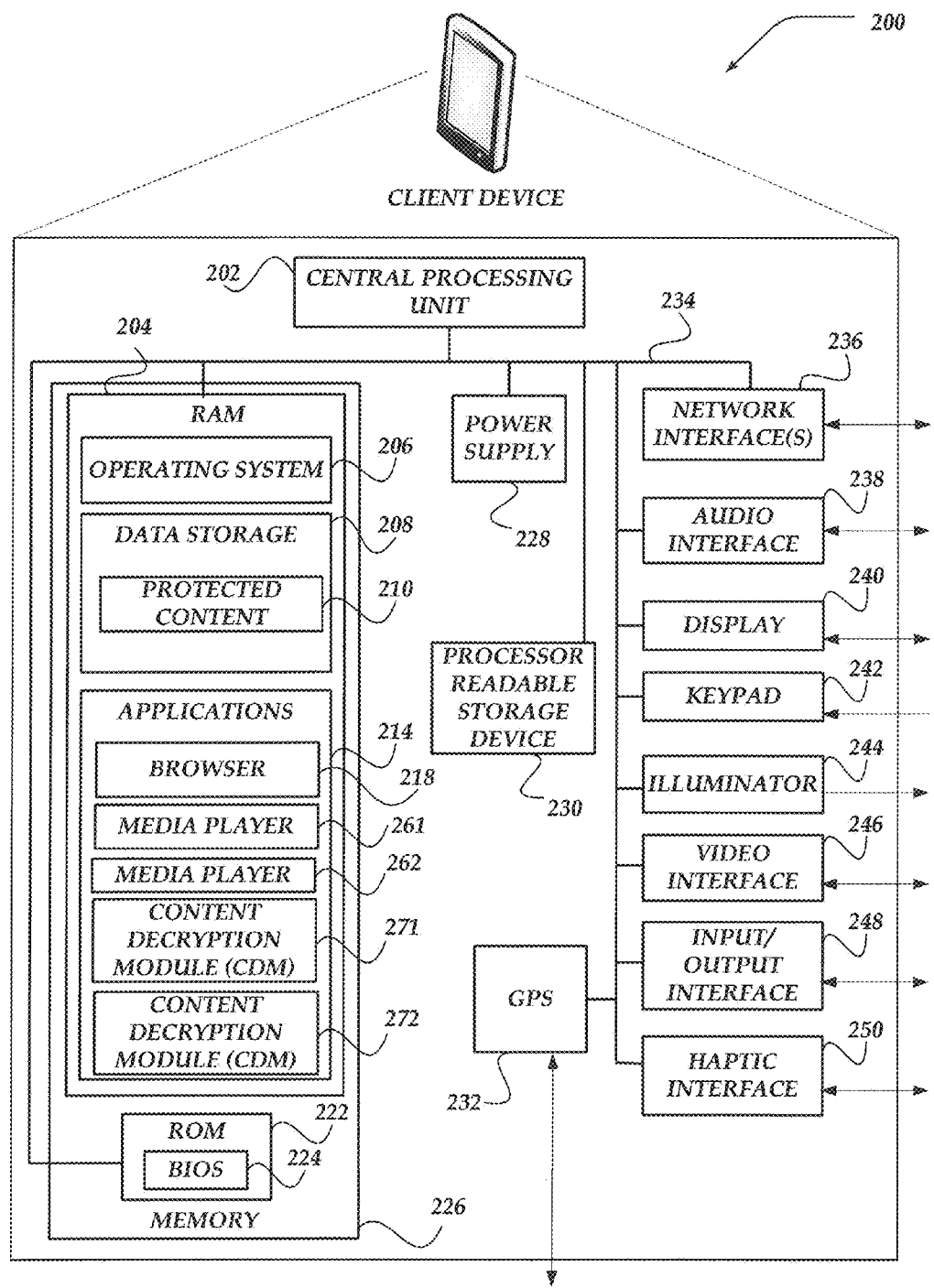
FIG. 2 illustrates one possible embodiment of a client device usable within the environment of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning systems ("GPS") receiver 232.

Power supply 228 provides power to client device 200. A rechargeable or non-rechargeable battery may be used to provide power. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide Interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. At least a portion of the information may also be stored on another component of network device 200, including, but not limited to computer readable storage device 230, a disk drive or other computer-readable storage device (not shown) within client device 200.

Data storage 208, in other embodiments, may further store content 210. Content 210 may include a plurality of different content that can be selected by a user of client device 200 to be accessed by one or more of media players 261-262 and provided to display 240, audio interface 238, or the like. In some embodiments, data storage 208 may act as a buffer for content received from CPD 110 of FIG. 1. As noted above, it is recognized that providing of such content may also be performed by another device on behalf of CPD 110 of FIG. 1.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VoIP") applications, contact managers, task managers, transcoders, database programs, word processing programs, security applications, spreadsheet programs, games, search programs, and so forth. Applications 214 may include, for example, browser 218, media players 261-262, and CDMs 271-272.

Browser 218 may include virtually any application configured to receive and display graphics, text, multimedia, and the like, employing virtually any web based protocol. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200 to provide and/or receive content from another computing device, such as CPD 110 of FIG. 1. Although browser 218 is described herein, it should be noted that there are a plurality of other applications that may operate as a user agent configured to request and/or access content. Thus, other user agents may also be included within client device 200.

Media players 261-262 represents any of a variety of software and/or hardware configurations arranged to receive and play various content. As discussed above, such players may be software applications that may be received from MPPDs 111-113 of FIG. 1. In one embodiment, MPPDs 111-113 may provide updates in a form of an updated version of a media player application. In another embodiment, MPPDs 111-113 may also provide a configuration of a media player that includes hardware. As such, in one embodiment, media players 261-262 may also represent a hardware component that might be installed within client device 200 and/or coupled electrically to client device 200 to enable client device 200 to access and play content.

In one embodiment of Content Decryption Modules (CDMs 271-272 is described in more detail below in conjunction with FIG. 4. Briefly, however, CDMs 271-272 represent any of a variety of software and/or hardware configurations arranged to receive encrypted content, and based on various rules, rights, and the like, decrypt the content and provide the decrypted content to one or more media players 261-262. In one embodiment, a CDM may be embedded with a media player, such that when a user downloads and/or otherwise installs a media player, a CDM is also received and/or installed. In one embodiment, the media player may be configured to access a single CDM. However, in another embodiment, a media player 261-262 may also be configured to use one or more different CDMs 271-272, based on any of a variety of criteria, including, but not limited to how content is protected, a preference by a media player, a preference by a content provider, or the like.

Illustrative Network Device

Figure 3:
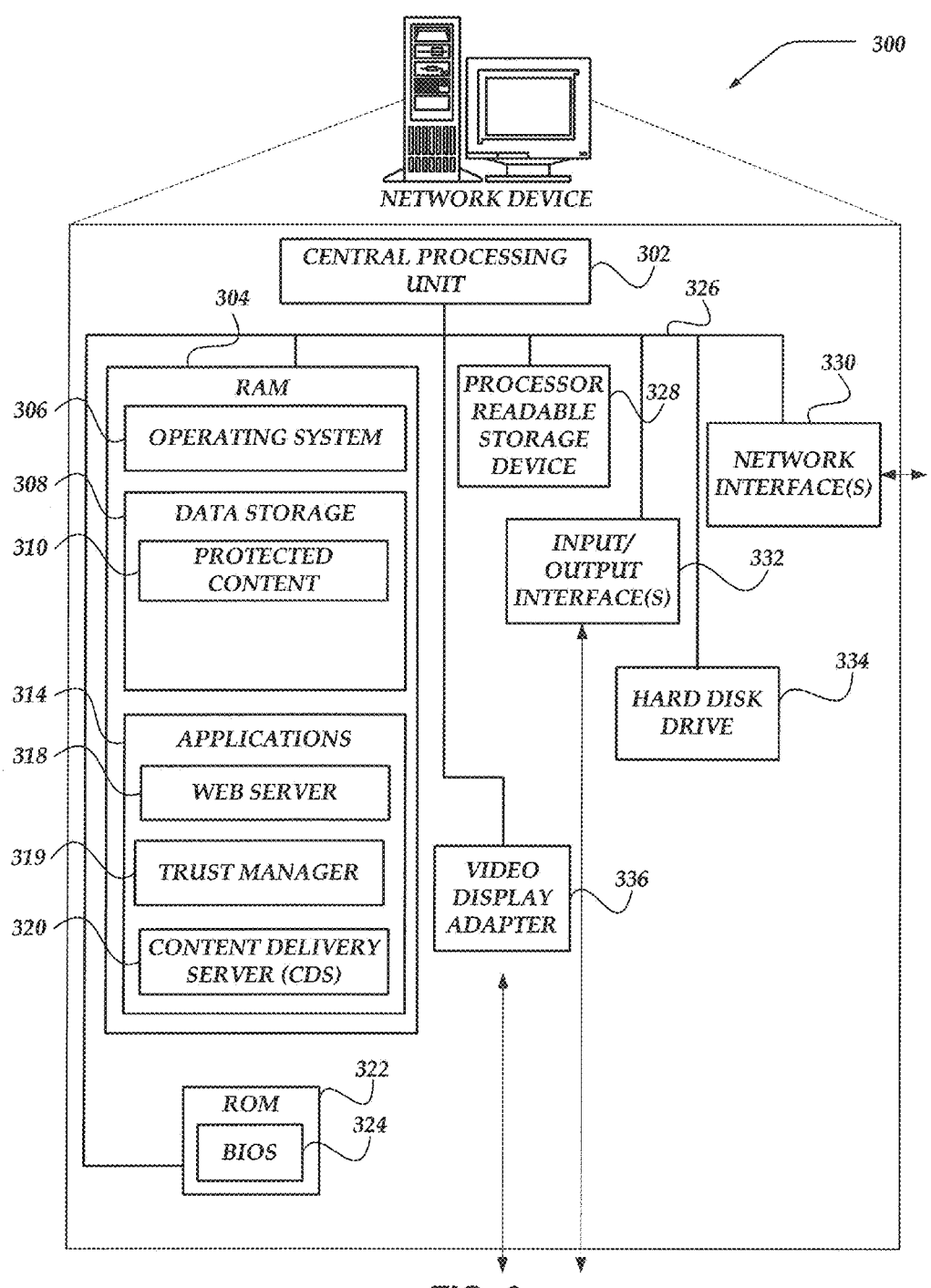
FIG. 3 illustrates one possible embodiment of a network device usable by a content provider within the environment of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, a client, a peer, a host, or any other device. Network device 300 may represent, for example CPD 110 of FIG. 1.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to computer readable storage device 328, hard disk drive 334, or the like.

Data storage 308 may further store protected content 310. Protected content 310 represents any of a variety of content that may be protected from access using a license, encryption, and/or the like. In some embodiments, protected content 310 may include a plurality of available versions of content. In one embodiment, the available versions may include one or more video tracks and/or one or more one or more audio tracks. In some embodiments, each video track may be in a different video format, quality, or the like. In other embodiments, each audio track may be in a different audio format, quality, audio language, or the like.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318, trust manager 319, and content delivery server 320, may also be included as application programs within applications 314.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Web Server 318 may also be configured to enable a user of a client device, such as client devices 101-106 of FIG. 1, to browse content, such as protected content 310, and select content for display/play on the client device.

Trust Manager 319 is configured to manage trust relationships with one or more Media player providers/CDM providers, or the like. In one embodiment, such trust relationships may be evaluated and/or otherwise established using any of a variety of processes. For example, a content provider may elect to trust attestations by a third-party about a media player, a version of a media player, a CDM, a version of a CDM, or the like. Then, based on the attestations, Trust Manager 319 may elect to establish a trust relationship for the media player, CDM, and/or a version thereof. The trust relationship may also be established at various levels, including, a provider level, a product level, a version of a product, or the like. In one embodiment, Trust Manager 319 might maintain information about the trust within Data storage 310.

In one embodiment, content provider might elect to establish trust relationships based on information that a Certification Authority, such as KMD 114 of FIG. 1 may maintain. For example, KMD 114 might elect to manage those certificates and public keys for which a third-party attests a corresponding provider, product, version, or the like, of a media player and/or CDM is to be trusted. Otherwise, KMD 114 of FIG. 1 might elect to indicate that a trust is not to be established using, for example, a CRL, or the like.

In any event, trust manager 319 may receive information from a third-party, KMD, and/or media player/CDM providers, and elect to establish a trust relationship, revoke a trust relationship, or the like, based on the received information.

Content Delivery Server (CDS) 320 is configured to manage access to protected content 310. In one embodiment, the content may be protected through a license. In another embodiment, the content may be protected by being encrypted. In one embodiment, one portion of content may be encrypted using a first content encryption key; while another portion of the content may be encrypted using a second content encryption key. Thus, to decrypt the protected content, a user's client device may need access to a license that indicates how, where, and/or when the protected content may be accessed. The user's client device may also need access to one or more decryption keys usable to decrypt various portions of the protected content. However, in another embodiment, the content may be protected by a license(s) and not be encrypted using encryption key(s).

CDS 320 may receive from a client device, such as client devices 101-106 of FIG. 1 a request for a license and/or one or more decryption keys for access to protected content. CDS 320 may then determine which public key or keys to employ for use in encrypting the license and/or decryption keys. CDS 320 may employ a process such as described below in conjunction with FIG. 7 in selecting which public key(s) to employ. CDS 320 may then selectively encrypt and provide the encrypted license/decryption key(s) to the requesting client device. In one embodiment, CDS 320 may select to encrypt and provide the license/decryption key(s) based on an integrity of the client device/media player, and/or CDM within the client device. In another embodiment, CDS 320 may select to provide the encrypted license/decryption(s) to the client device based on whether trust manager 319 indicates that a trust relationship is established with a media player and/or CDM configuration supported by the requesting client device. CDS 320 may employ a process such as described below in conjunction with FIG. 6 to perform at least some of its actions.

Figure 4:
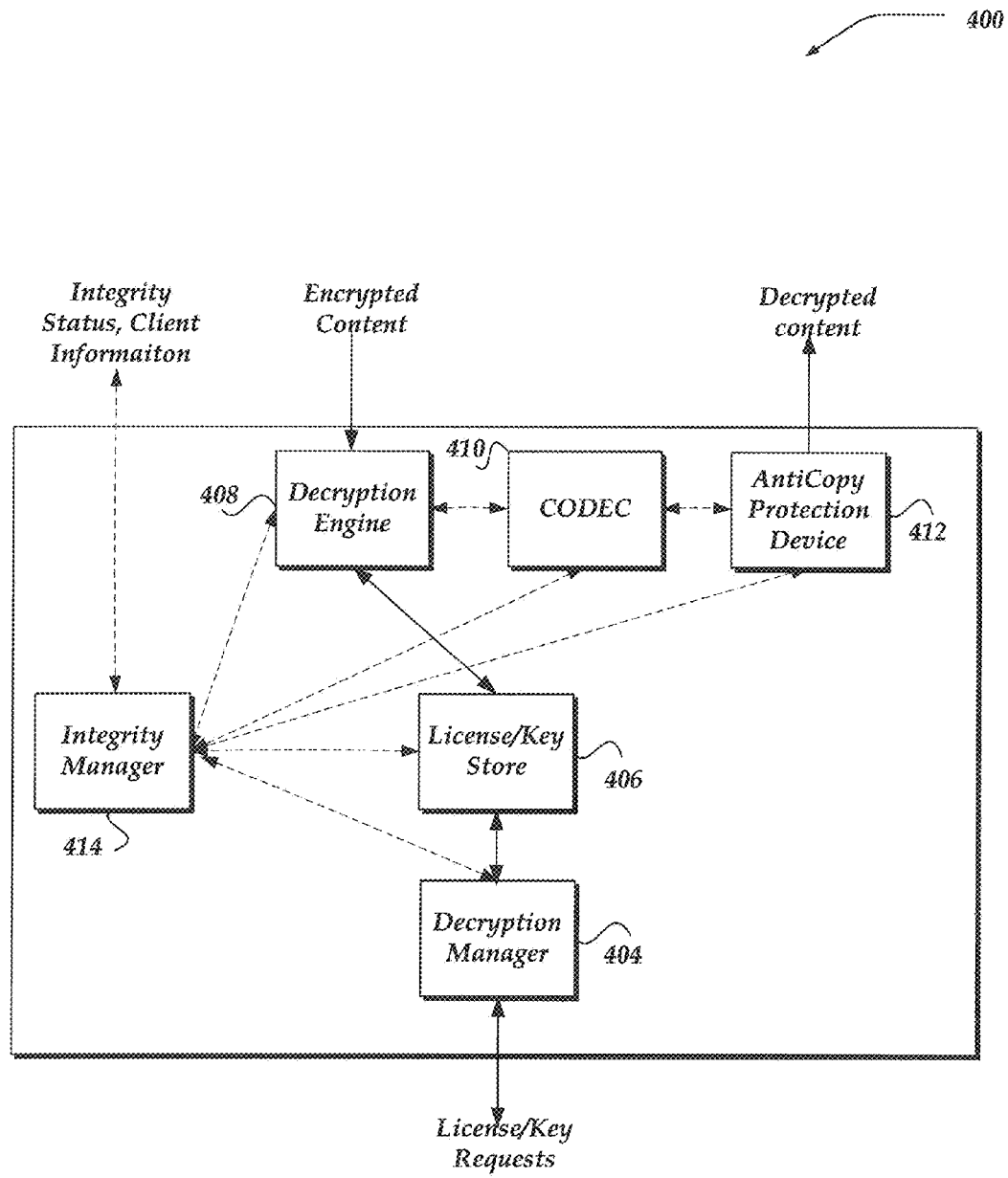
FIG. 4 illustrates one non-limiting, non-exhaustive embodiment of a content decryption module usable within a client device.

FIG. 4 illustrates one non-limiting, non-exhaustive embodiment of a content decryption module (CDM) usable within a client device. CDM 400 of FIG. 4 may include many more or less components than those shown in FIG. 4. However, the components shown are sufficient to disclose an illustrative embodiment for practicing the present invention. CDM 400 may represent, for example, one embodiment of at least one of CDMs 271-272 of FIG. 2.

As shown, CDM 400 includes integrity manager 414, decryption manager 404, license/key store 406, decryption encryption engine 408, Compressor/Decompressor (CODEC) 410, and anticopy protection device 412.

As noted above, CDM 400 may receive encrypted content from a media player, such as media players 261-262 of FIG. 2, and selectively provide the decrypted content to the media player for play, based on at least a license and/or one or more decryption keys. Although illustrated above as being employed within a client device, such as client device 200, CDM 400 may also be configured to operate within a digital recorder, set-top-box, jukebox, internet-music-player/honestereo system, a special purpose hardware media player, or the like.

Decryption engine 408 is configured to receive encrypted content. Such encrypted content may be encrypted into one or more content units, based on a variety of criteria. In one embodiment, at least one of the content units may be encrypted using a different content encryption key than another content unit. As used herein, the term "content unit" refers to any partitioning of content in one or more portions. Such partitioning may be performed for any of a variety of reasons, using any of a variety of mechanisms, including for streaming reasons, for block size management, or the like.

The encryption of the content may be performed at CPD 110 of FIG. 1, or by one or more of its representatives, using a content encryption key. A content encryption key may be generated employing any of a number of encryption/decryption symmetric mechanisms, including, but not limited to Advanced Encryption Standard (AES), RSA, RC6, IDEA, DES, RC2, RC5, Skipjack, and any other symmetric encryption algorithm. Moreover, such encryption algorithms may use, where appropriate, cipher block chaining mode, cipher feedback mode, CBC cipher text stealing (CTS), CFB, OFB, counter mode, and/or any other block mode. In one embodiment, content encryption keys are generated employing an at least 128 bit AES encryption/decryption algorithm. However, content encryption key generation is not limited to symmetric key mechanisms, and asymmetric key mechanisms may also be employed without departing from the scope of the present invention. Typically, where the content encryption key is a symmetric encryption key, such content encryption keys are also referred to as decryption keys, as the same key may be used to both encrypt and to decrypt the content.

In any event, upon receipt of at least one content unit of the content, decryption engine 408 may make a determination whether the content unit is encrypted. Where a content unit is encrypted, decryption engine 408 may request access to one or more decryption keys. In one embodiment, the decryption keys may be received within one or more units of data accompanying the received content. In another embodiment, the content decryption key(s) may be received separate from the content, based on a request from CDM 400 and/or a media player. In one embodiment, the content decryption key(s) may be encrypted using a public key associated with a private key stored within license/key store 406.

Decryption engine 408 may request a private key from License/Key store 406 to decrypt the decryption key(s) to, in turn, enable the extraction of one or more content keys associated with the encrypted content unit. Decryption engine 408 employs the one or more content keys to decrypt the encrypted content unit. Decryption engine 408 optionally may further provide the decrypted content unit to CODEC 410.

CODEC 410 includes any of a variety of compression/decompression mechanisms configured to receive compressed content and decompress the content into a format capable of being rendered for the user's enjoyment. For example, CODEC 410 may employ Moving Pictures Experts Group (MPEG), Joint Photographic Experts Group (JPEG), wavelets, and/or any other mechanism that compresses content that may later be decompressed. Further, although CODEC 410 may include capabilities for graphical content, CODEC 410 may also be configured to receive audio content, and as appropriate, prepare the audio content for play by a media player as well. Thus, CODEC 410 may not be exclusive for graphical content, and may also operate on audio, graphical content, and/or content having a combination of audio and graphical information. CODEC 410 may then optionally provide the content to anticopy protection device 412.

Anticopy protection device 412 may optionally enable additional protections of decompressed content by scrambling, dirtying, and otherwise encrypting the decompressed content prior to providing it to a descrambler device, and the like. As such anticopy protection device 412 enables a level of protection of the content after it leaves CDM 400. For example, anticopy protection device 412 might be configured to inhibit screen scraping, monitor for, and/or otherwise inhibit illicit copying of content within a memory component of a client device, or the like, as the content is provided to a media player.

License/Key store 406 is configured to store and manage encryption/decryption keys, including a media player/CDM's private key that corresponds to its public key discussed above. License/key store 406 may also store a license associated with various content rights, and other associated information. The associated information may include entitlements, rights, and the like, associated with at least one of the content, a content decryption key, a user, a client device, a configuration, or the like. License/Key store 406 may include a database or flat data file, and the like, configured to store and manage the keys and the associated information in a secure manner. License/Key store 406 may employ content identifiers to index the decryption keys, licenses, and associated information.

License/Key store 406 typically securely retains the private key until decryption engine 408 requests it for decryption of a license, and/or decryption key(s). License/Key store 406, however, is configured to ensure that the private key is not made available beyond use within CDM 400. In one embodiment, license/key store 406 may employ any of a variety of mechanisms to protect at least the private key, including, obfuscation, whitebox crypto, hardware support, such as through a trusted platform module, or the like.

Decryption manager 404 is configured to make requests for licenses, decryption keys, or the like, in response to a request for access to content by one or more media players. In one embodiment, decryption manager 404 may be configured to send a request for a license and/or decryption key(s) to the media player, including with the request information about CDM 400, including, but not limited to a version of CDM 400, and/or other information usable by another network device in determining whether a trust relationship may exist with CDM 400. In one embodiment, a media player, such as media players 261-262 of FIG. 2 may send the information about CDM 400 over a network to a CPD, such as CPD 110 of FIG. 1.

In another embodiment, CDM 400, a media player, or the like, may receive a request from CPD 110 of FIG. 1, for information about the media player, and/or CDM 400. In this instance, the media player or user agent may provide information about a plurality of CDMs, and/or a plurality of media players, such as illustrated in FIG. 2. Thus, information about a configuration of a client device may be provided to CPD 110 based on request for such information from CPD 110, automatically by a media player or media players, and/or a CDM or CDMs, absent receiving a request from a CPD. In still another embodiment, neither the media players nor the CDMs of FIG. 2 might send information about themselves to a CPD.

In any event, decryption manager 404 may receive a license and/or decryption key(s) they may be encrypted based on a public key associated with CDM 400. Decryption manager 404 may provide the encrypted license and/or decryption key(s) to license/key store 406 until requested by decryption engine 408.

Decryption manager 404 and/or license/key store 406 may however receive information from integrity manager 414 indicating that a configuration of CDM 400, an associated media player, an associated client device, or the like is not to be trusted, that the configuration of one or more of at least these components can not be verified, and therefore, access to the license and/or decryption key(s) in an unencrypted state should be denied. In one embodiment, decryption manager 404 may elect to deny access to the license/decryption key(s) by erasing them, denying, actively denying access to the private key that decrypts the encrypted license/decryption key(s), or even, destroying the private key.

Integrity manager 414 is enabled to monitor the components in CDM 400, a media player making a request for content, and/or other components within a corresponding client device, to determine whether any component, including CDM 400, itself, is being tampered with, or otherwise associated with an unauthorized activity. For example, integrity manager 414 could be configured to operate at least at a FIPS security level 3.

Integrity manager 414 may perform various other integrity checks to determine an integrity of CDM 400, a media player, a signature associated with a private key, and/or other components of a corresponding client device. The integrity checks may include determining whether a version of CDM 400 is inconsistent with a corresponding private key stored in license/key store 406. However, integrity manager 414 may also perform virtually any other integrity checks to determine whether to allow access to a private key, license, and/or decryption key(s).

Integrity manager 414 may provide an integrity response based on the results of its monitoring. Such responses may include directing decryption manager 404 to erase or otherwise disabling access to the encrypted content, inhibiting access to a private key, locking CDM 400 from an operation, erasing of private keys, licenses, content keys, and the like, and reporting the detected unauthorized activity.

Figure 5:
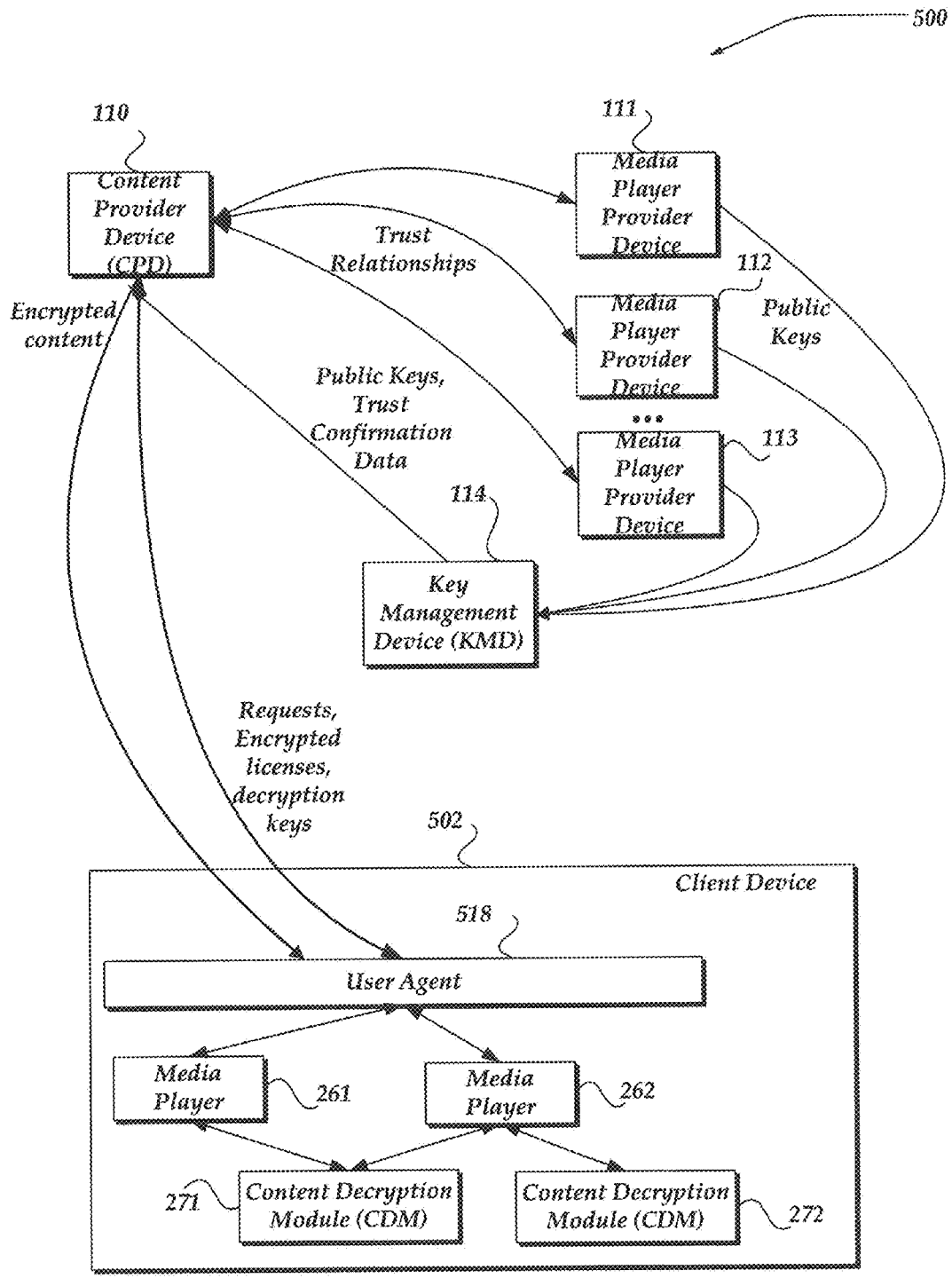
FIG. 5 illustrates one non-limiting, non-exhaustive example of data flows between various components within FIG. 1.

FIG. 5 illustrates one non-limiting, non-exhaustive example of data flows between various components within FIG. 1. Flow 500 may include many more or less components than those shown. The components shown, however, are sufficient to disclose an illustrative embodiment for practicing the invention.

Briefly, as shown, flow 500 includes substantially similar components as discussed above with respect to FIGS. 1-4, including CPD 110, MPPDs 111-113, and KMD 114 of FIG. 1. Client device 502 operates substantially similar to client devices 101-106 of FIG. 1, and client device 200 of FIG. 2. Illustrated within client device 502 is user agent 518, media players 261-262, and CDMs 271-272. User agent 518 may include any application, including, such as discussed above, browser 218 of FIG. 2. Shown is that while a single media player 262 may access and/or otherwise employ a single CDM (CDM 271), in another embodiment, a media player, such as media player 262 may access and/or otherwise employ multiple CDMs (271-272). Further, although shown that a CDM may be shared between different media players, in another embodiment, a CDM may be dedicated to a particular media player. In addition, while not shown, in still another embodiment, a CDM may be embedded within a media player. Further, in some embodiments, the media player may also be embedded with another application/user agent, device, or the like.

Moreover, because a media player may have access to a plurality of different CDMs, in one embodiment, the media player, and/or user agent, might select which CDM to employ. However, in another embodiment, the selection of the CDM may also be based on which public key is used to encrypt a license(s)/decryption key(s), or the like.

Flow 500 illustrates that various trust relationships may be established between CPD 110 and MPPDs 111-113. In one embodiment, the trust relationships may be established using a third-party, such as KMD 114, or another party (not shown).

Shown in FIG. 5, in one embodiment, public keys for an MPPD and/or a CDM may be provided by MPPDs 111-113. However, as discussed above, in another embodiment, the public keys, corresponding to a private key may be provided by a CDM, such as CDMs 271-272.

It should be recognized that other private/public key access mechanisms are also envisaged. For example, the CDM and/or media player device might be configured during production to include per device certificates for managing key access. In such instances, in one embodiment, a signing/encryption capability might be restricted in a similar manner as access to the private keys may be. Further, CPD 110, MPPDs 111-113, and/or KMD 114 would still, in one embodiment, verify the validity of the certificate that signs/encrypts content, requests, and/or other messages.

Similarly, in still another embodiment, shared keys might be embedded within CDMs, media players, or the like, with attestation being performed via the above mentioned certificates, or the like, with trust relationships being established as discussed above.

In any event, the public keys may be provided to KMD 114 for storage using, for example, a public key certificate infrastructure. When it is determined that a public key and therefore a corresponding MPPD, CDM, and/or a version thereof, is not to be trusted, KMD 114 may also make available CRLs indicating that a certificate is revoked, and that the public key is not to be trusted.

When a request for protected content, a license, and/or decryption key(s) is received by CPD 110, CPD 110 may access one or more public keys from KMD 114 based on an established trust relationship with the corresponding MPPD, CDM, or the like. When no trust relationship exists between CPD 110, MPPD, CDM, or the like, CPD 110 may elect to establish a trust relationship, or refuse to access the public keys, and therefore, deny access to the protected content, license, and/or decryption keys.

When a trust relationship exists; however, CPD 110 may use the public key to encrypt the license/decryption key(s) and provide them to a requesting client device, such as client device 502.

General Operation

Figure 6:
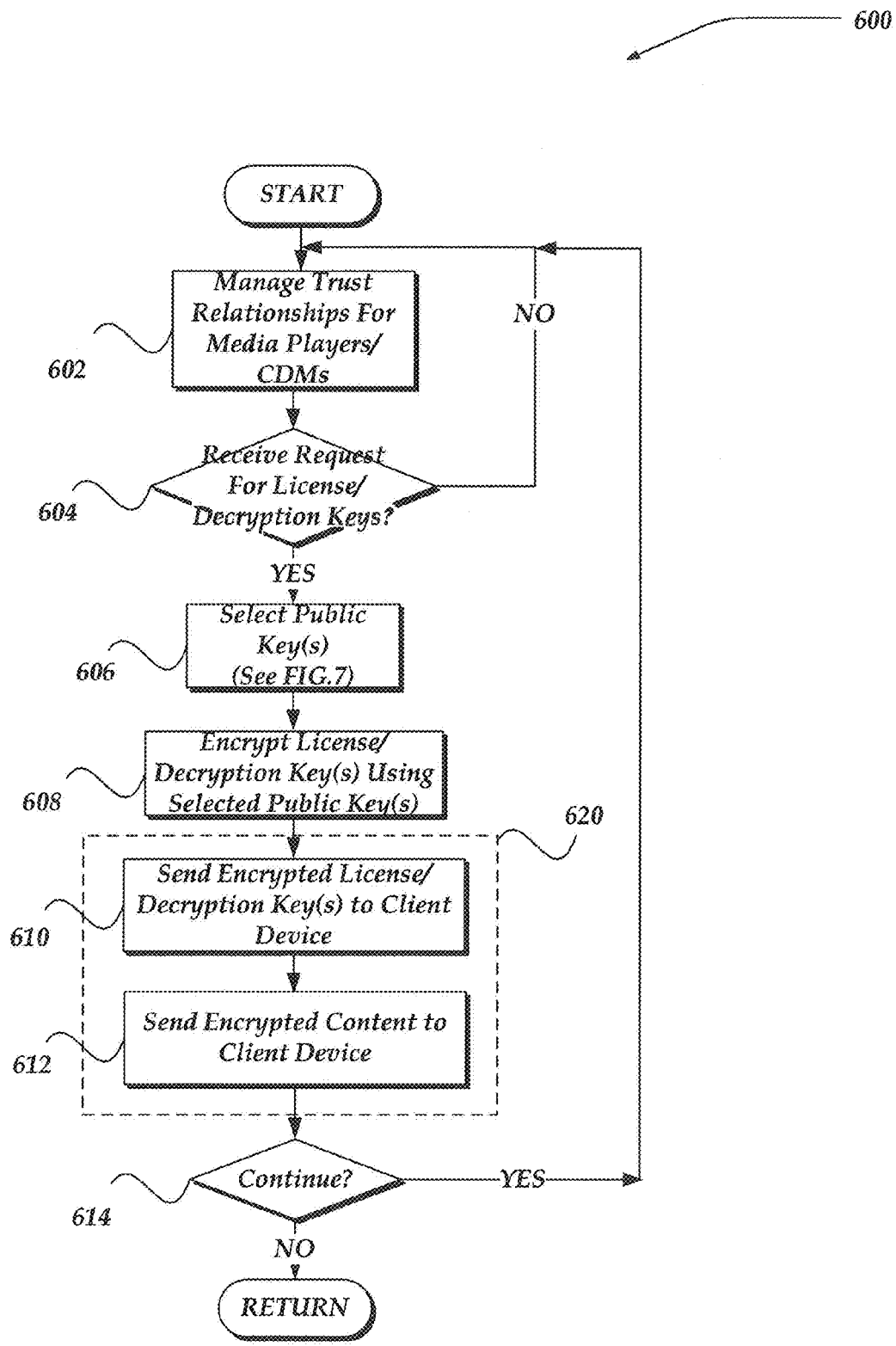
FIG. 6 illustrates one embodiment of a flow diagram usable by a content provider or its representative for managing access to licenses/decryption key(s) using trust relationships.

The operation of certain aspects of various embodiments will now be described with respect to FIGS. 6-8. FIG. 6 illustrates one embodiment of a flow diagram usable by a content provider device or its representative for managing access to licenses/decryption key(s) using trust relationships. Thus, process 600 of FIG. 6 may be performed within CPD 110 of FIG. 1.

Process 600 begins, after a start block, at block 602, where trust relationships are managed for various media players, CDMs, and/or combinations, versions, and so forth. Management of such trust relationships may include, but are not limited to establishing trust relationships at a provider lever, a product level, and combination of product levels, and/or a version level. It should be noted that trust relationships might not be established for all combinations, or providers of media players, CDMs, or the like. Further, based on various reasons, including, for example, inconsistent quality control of a product, a computer hack or other corruption of a product, an integrity compromise of a product, a business disagreement, a contract breach, or the like, a trust relationship may be severed, revoked, or may not be established. Thus, block 602 includes establishing, denying, revoking trust relationships, or otherwise updating trust relationships.

Processing continues to decision block 604, where a determination is made whether a request for a license and/or decryption key(s) are received for content protected by the license/decryption key(s). When a request is received, processing flows to block 606; otherwise, processing may loop back to block 602 to continue to manage trust relationships.

One embodiment of block 606 is described in more detail below in conjunction with FIG. 7. Briefly, however, at block 606, one or more public keys are selected based on trust relationships for use in encrypting the requested license/decryption key(s).

Flowing next to block 608, the one or more public keys are used to encrypt the license/decryption key(s). In one embodiment, where multiple public keys are received from block 606, a plurality of encrypted licenses may be generated, where the license is encrypted by a different one of the multiple public keys. Similarly, plurality of decryption key(s) may be generated, where the decryption key(s) are encrypted by a different one of the multiple public keys.

Continuing to block 610, in one embodiment, the encrypted license(s)/decryption key(s) are sent to a requesting client device. Flowing to block 612, content that is protected by the license/decryption key(s) may also be provided. However, in another embodiment, such protected content might already have been provided to the client device, perhaps, in one embodiment, by another network device.

Further, as illustrated by dashed block 620, blocks 610 and 612 may be combined. That is, in one embodiment, the encrypted license(s)/decryption key(s) may be appended, or otherwise combined with the protected content, and the combination may be sent to the client device. Thus, it should be clear that embodiments are not constrained to a particular mechanism for providing the protected content, encrypted license(s), and/or decryption key(s), and any of a variety of ways may be used.

Process 600 may next flow to decision block 614, where a determination is made to continue process 600. If so, processing may loop back to block 602; otherwise, processing may return to another process, to perform other actions.

Figure 7:
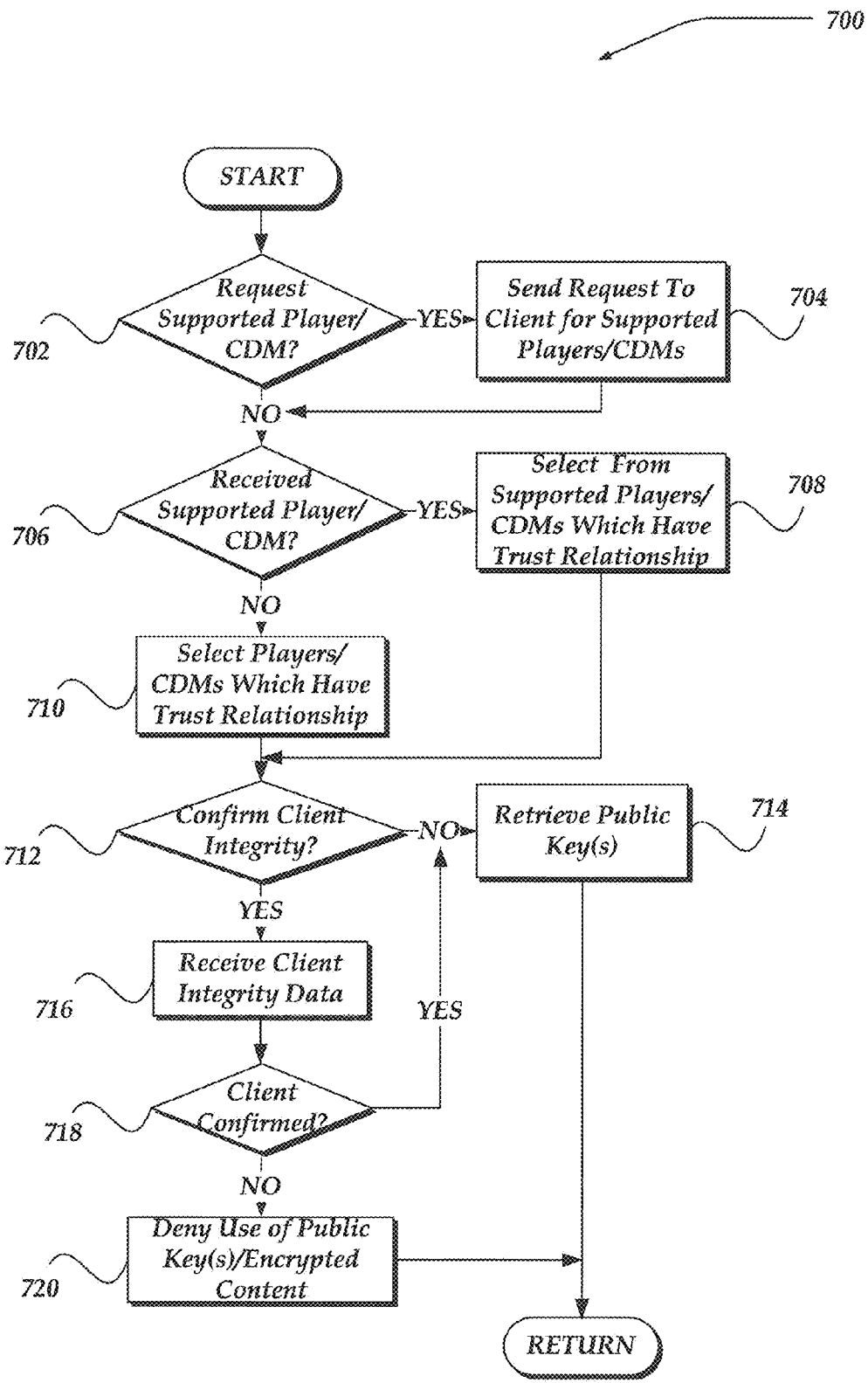
FIG. 7 illustrates one embodiment of a flow diagram usable by a content provider or its representative for selecting public keys using trust relationships.

FIG. 7 illustrates one embodiment of a flow diagram usable by a content provider device or its representative for selecting public keys using trust relationships. Process 700 of FIG. 7 may represent one embodiment of a process usable at block 606 of FIG. 6.

Process 700 begins, after a start block, at decision block 702, where a determination is made whether to request which media player(s)/content decryption modules are supported by the requesting client device. If the client device has not provided such information, then in one embodiment, processing may flow to block 704, where a request is sent to the client device for such information. Processing then flows to decision block 706. However, at decision block 702, where no request is to be sent to the client device for information about a configuration of media player/CDM supported by the client device, then processing may also flow to decision block 706.

At decision block 706, a determination is made whether configuration information is received from the client device indicating what media player/CDM(s) are supported by the client device. In one embodiment, an application, user agent, or the like, within the client device may send a query to a media player/CDM requesting configuration information. The query may be performed automatically without having received a request for the information at block 704, or in response to the request received at the client device from block 704. In one embodiment, the request at the application in the client device may employ various techniques, including, but not limited to a canPlayType( ) method, command, or the like. Other mechanisms may also be used. In any event, when configuration information is received from a client device, processing flows to block 708; otherwise, processing flows to block 710.

At block 708, a review of existing trust relationships is performed to determine whether a trust relationship is established for the media player(s)/CDM(s) identified by configuration information received from the client device. It may be that several media player(s)/CDM(s) have trust relationships. In this instance, in one embodiment, each of the configurations where a trust relationship is established may be selected. In one embodiment, a subset of configurations with established trust relationships may be selected, based on various criteria, including a level of trust, a frequency of use, a business agreement with the MPPD/CDM providers, to limit a number of encryptions of licenses/decryption keys performed, or the like. Processing then flows to decision block 712.

At block 710, it has been determined that no information is received from the client device about a configuration of supported media players/CDMs. In this instance, in one embodiment, a review of established trust relationships may indicate that one or more media players/CDMs may have established trust relationships. Again, using similar criteria or different criteria as discussed at block 708, one or more configurations may be selected based on the established trusted relationships and criteria. Processing flows next to decision block 712.

At decision block 712, a determination is made whether an integrity of the client device is confirmed. In one embodiment, this may be an optional decision block. That is, in one embodiment, process 700 might assume that such integrity is managed based on a trust relationship, and therefore, this action need not performed. In another embodiment, a review of a CRL, or the like may be performed to reconfirm that the trust relationship is not revoked, based at least in part on a revocation of a certificate, or the like.

If an integrity check is to be performed, processing flows to block 716, where such checks may be performed, including, requesting, and/or receiving information from a CDM within a client device, checking CRLs, and/or confirming other information indicating that the integrity of the client device is confirmed. Further, in one embodiment, verification/attestation may also employ public key encryption. In one embodiment, such verification may employ the same trust relationships and interoperability as used for encrypting of a license/decryption key(s), as discussed elsewhere.

At decision block 718, if it is determined that the client device's integrity is confirmed, processing flows to block 714; otherwise, processing flows to block 720.

At block 720, access to a requested license/decryption key(s) may be denied. In one embodiment, this may be performed by refusing to use public keys, encrypting, and/or sending encrypted license(s)/decryption key(s) to the client device. In one embodiment, sending of the protected content may also be denied, terminated, or access otherwise hindered. Processing then returns to a calling process to perform other actions.

At block 714, where trust relationships for one or more media players/CDMs are established, corresponding public keys for the trust relationships may be accessed. The public keys may then be used (in process 600) to encrypt the license(s)/decryption key(s). Processing then returns to a calling process to perform other actions.

Figure 8:
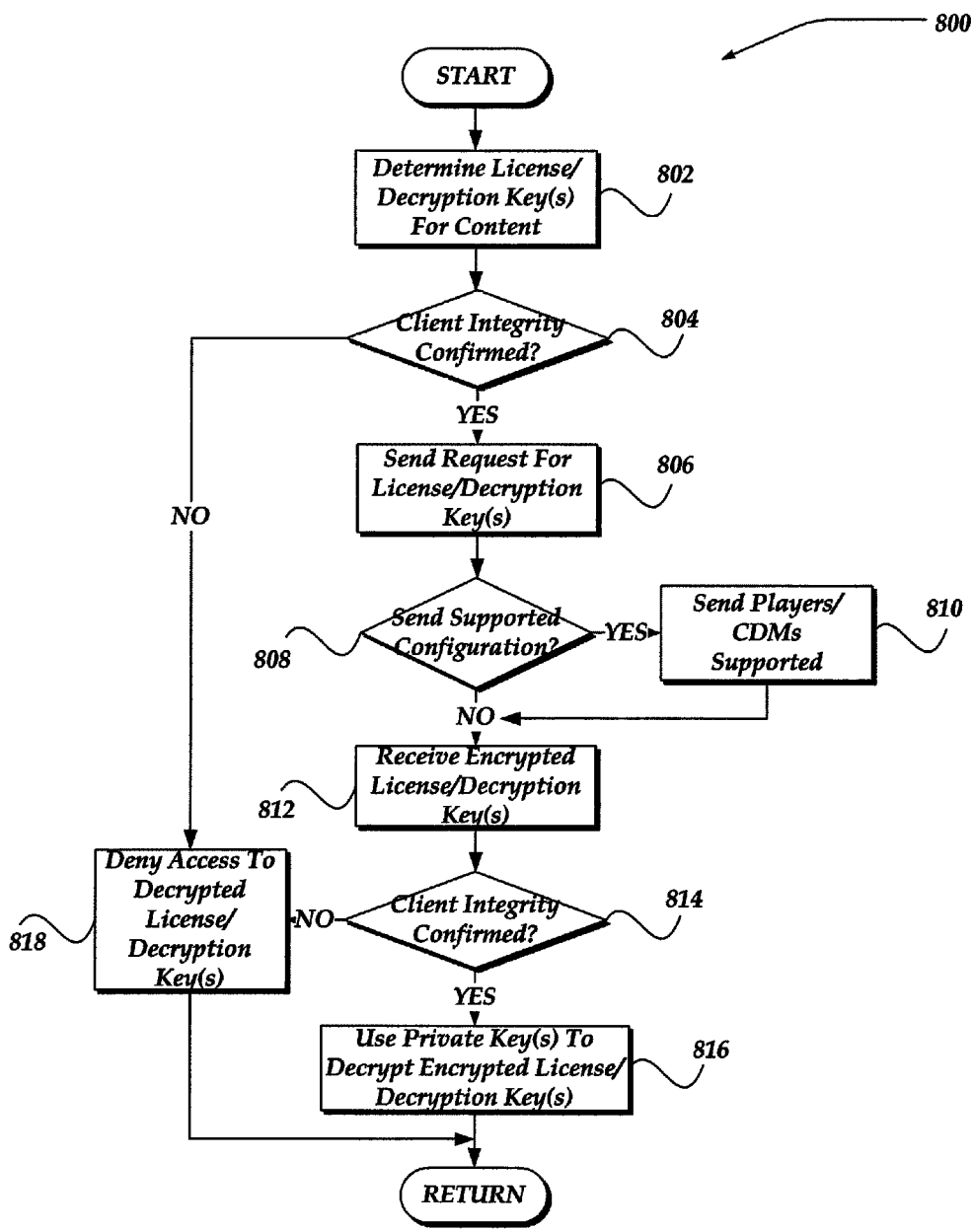
FIG. 8 illustrates one embodiment of a flow diagram usable by a client device for accessing license/decryption key(s) for use in accessing protected content.

FIG. 8 illustrates one embodiment of a flow diagram usable by a client device for accessing license/decryption key(s) for use in accessing protected content. Process 800 of FIG. 8 may be implemented within a client device, such as illustrated in FIGS. 1-2, and 5, where at least a portion of the process may be implemented within a CDM, media player, and/or a user agent within the client device.

Process 800 begins, after a start block, at block 802, where a determination is made as to whether a license/decryption key(s) are needed by a client device to access content. In one embodiment, such determination may include information about where to access the license/decryption key(s), including information about a content provider's device, or the like. In one embodiment, such information might take the form of a Universal Resource Locator (URL), or other network address to the content provider's device, or repository for licenses/decryption key(s). In one embodiment, a client device may have received the protected content, and attempted to display, play, or otherwise access the content, and received information from a CDM, media player, or the like, that a license, and/or decryption key(s) are needed.

Processing may continue to decision block 804, where a determination is made as to an integrity of the client device, the CDM attempting to access the content, a media player attempting to access the content, operating system, platform, software environment, or the like. As discussed above, the CDM may include one or more modules arranged to monitor an integrity of various components of the client device, and determine whether or not the integrity is confirmed, unverifiable, or otherwise fails an integrity analysis. If at decision block 804, the integrity of the client device, CDM, and/or media player is confirmed, processing flows to block 806; otherwise, processing flows to block 818.

At block 806, a request for a license(s)/decryption key(s) may be sent to a content provider device. In one embodiment, the request may be sent from a CDM through a media player, and application or user agent to a CPD.

Continuing to decision block 808, a determination is made whether to send information indicating a configuration of the client device, including, what media player(s)/CDM(s) is supported by the client device. If so, processing flows to block 810; otherwise, processing flows to block 812. It should be recognized that sending of such information may also occur outside of process 800.

At block 810, a query may be performed within the client device to determine the configuration of media players/CDMs supported. The configuration information may then be sent to a CPD. Processing then flows to block 812.

At block 812, one or more encrypted licenses and/or one or more decryption keys are received. Flowing next to decision block 814, in one embodiment, another integrity check may be performed. In one embodiment, although illustrated as separate blocks within process flow 800, the integrity checks may be performed concurrent with process 800, such that an interrupt, or other action may be performed indicating whether the integrity of the media player, CDM, and/or client device is confirmed. If the integrity check returns a negative indication, then processing flows to block 818; otherwise, processing flows to block 816, where private key(s) are accessed corresponding to the public key(s) used to encrypt the received license(s)/decryption key(s). The private key(s) may then be used to decrypt the license(s)/decryption key(s) and enable access to the protected content. For example, in one embodiment, the decrypted decryption key(s) may be used to subsequently decrypt one or more portions of the protected content, while the decrypted license(s) provide instructions indicating where, when, how, by whom, and the like, regarding rights and/or entitlements to the protected content. Where a plurality of encrypted licenses/decryption keys are provided, a selection of which license/decryption key to decrypt may be performed using any of a variety of mechanisms, including, but not limited to header information, tags, and/or any of a variety of other structures, indices, or the like. Processing then returns.

At block 818, however, where the integrity of the client device is unverifiable, is determined to have failed integrity checks, or similar sub-levels of criteria, the access to one or more private keys may be denied, such that decryption of the license(s)/decryption key(s) is denied. As noted above, other actions may also be performed. Processing then returns.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system, comprising:
  a network device associated with a content provider, having one or more processors configured to perform actions, including:
    establishing a trust relationship using a cryptographic protocol with a content decryption module (CDM) provider's network device for a version of a CDM and the network device associated with the content provider;
    when information is received from a client device indicating that the client device supports at least the version of the CDM;
      determining for which of the supported CDMs the network device has an established trust relationship with a corresponding CDM provider;
      using the established trust relationships for the supported CDMs, accessing a public key associated with the version of the CDM supported by the client device; and
      encrypting a license using the accessed public key, the license protecting access to media content; and
    when it is determined that no information is received from the client device indicating the client device supports at least the version of the CDM:
      using trust relationships established between the network device and a plurality of different CDM providers to access respective public keys associated with CDMs from the plurality of different CDM providers,
      encrypting the license with each of the accessed public keys to generate a plurality of encrypted licenses, and
      providing each of the encrypted licenses to the client device; and the client device, comprising:
  a plurality of CDMs, wherein one of the plurality of CDMs is the version of the CDM, and wherein the version of the CDM performs actions, including:
    receiving from the network device, the encrypted license;
    determining an integrity of the version of the CDM and a media player against tampering;
    in response to determining that the integrity of the version of the CDM and the media player is confirmed, decrypting the license using a private key associated with the public key, and using the decrypted license to enable access to media content protected by the license; and
    in response to determining that the integrity of the version of the media player is not confirmed, denying access to the private key for decryption of the license and access to the media content protected by the license.

2. The system of claim 1, wherein the network device performs actions,
  wherein sending each of the plurality of encrypted licenses to the client device, comprises wherein at least one other CDM in the plurality of CDMs is selected at the client device to decrypt one of the plurality of encrypted licenses using a private key associated with a corresponding public key for the other CDM.

3. The system of claim 1, wherein the network device performs actions, further including:
  querying the client device to determine which of the plurality of CDMs the client device supports.

4. The system of claim 1, wherein the network device performs actions, further including:
  receiving from the client device, information indicating that the client device supports the version of the CDM absent sending a query request to the client device to determine which version of the CDM is supported by the client device.

5. The system of claim 1, wherein encrypting the license, further comprises encrypting one or more content decryption keys that are configured to enable decryption of the media content at the client device by using the private key to decrypt the one or more content decryption keys.

6. The system of claim 1, wherein the client device further comprises:
  one or more media players that is configured to select one or more of the plurality of CDMs to access the media content.

7. A network device, comprising:
  a memory for storing protected content; and
  one or more processors that perform actions, including:
    establishing a trust relationship cryptographically with a network device associated with a content decryption module (CDM) provider for a version of a CDM and the network device, wherein the network device is associated with a provider of the protected content;
    when information is received from a client device indicating that the client device supports at least the version of the CDM;
      determining for which of the supported CDMs the network device has an established trust relationship with a corresponding CDM provider;
      using the established trust relationships for the supported CDMs, accessing a public key associated with the version of the CDM;
      encrypting a license/decryption key to access content using the accessed public key; and
      providing the encrypted license/decryption key to a client device having at least the version of CDM, wherein the version of the CDM is configured to access a protected private key corresponding to the public key, decrypt the encrypted license/decryption key using the private key, and enable access to the content, based in part on an integrity of the client device including the integrity of at least the version of the CDM, the integrity being determined by at least the version of the CDM; and
    when it is determined that no information is received from the client device indicating the client device supports at least the version of the CDM:
      using trust relationships established between the network device and a plurality of different CDM providers to access respective public keys associated with CDMs from the plurality of different CDM providers,
      encrypting the license/decryption key with each of the accessed public keys to generate a plurality of encrypted licenses/decryption keys, and
    providing each of the encrypted licenses/decryption keys to the client device.

8. The network device of claim 7, wherein the one or more processors perform actions, further including:
  sending each of the plurality of encrypted licenses/decryption keys to the client device, wherein at least one other CDM in the plurality of CDMs is selected by the client device to decrypt one of the plurality of encrypted licenses/decryption keys using a private key associated with a corresponding public key for the other CDM.

9. The network device of claim 7, wherein the one or more processors perform actions, further including:
  querying the client device to determine which of a plurality of CDMs the client device supports; and
    wherein providing each of the encrypted licenses/decryption keys to the client device, further comprises the client device selects which CDM to employ to decrypt one of the plurality of encrypted licenses/decryption keys to enable access to the content.

10. The network device of claim 7, wherein the one or more processors perform actions, further including:
  receiving from the client device, information indicating that the client device supports another CDM absent sending a query request to the client device to determine which CDM is supported by the client device.

11. The network device of claim 7, wherein the one or more processors perform actions, further including:
  determining that a trust relationship is not established for at least one other CDM provider for another CDM; and
  based on the determination of no established trust relationship for the one other CDM provider, refusing to employ another public key associated with the other CDM provider to encrypt and send to the client device the license/decryption key.

12. The network device of claim 7, wherein the one or more processors perform actions, further including:
  receiving information indicating that at least one of a private key is compromised or an integrity of at least one component of the client device is compromised, and based on the received information refusing to use the compromised public key or to send the license/decryption key to the compromised client device.

13. The network device of claim 7, wherein establishing the trust relationship further comprises receiving at least one attestation from a third-party indicating a level of quality of the CDM provider or version of the CDM.

14. An apparatus comprising a non-transitory computer readable medium, having computer-executable instructions stored thereon, that in response to execution by a computing device, cause the computing device to perform operations, comprising:
- establishing a trust relationship over a network using a cryptographic mechanism with a network device associated with a content decryption module (CDM) provider for a version of a CDM and the computing device that is associated with a content provider;
- when information is received from a client device indicating that the client device supports at least the version of the CDM;
  - determining for which of the supported CDMs the network device has an established trust relationship with a corresponding CDM provider;
  - using the established trust relationships for the supported CDMs, accessing a public key associated with the version of the CDM;
  - encrypting a license/decryption key to access content using the accessed public key; and
  - providing the encrypted license/decryption key to a client device having at least the version of CDM, wherein the version of the CDM is configured to access a protected private key corresponding to the public key, decrypt the encrypted license/decryption key using the private key, and enable access to the content, based in part on an integrity of the client device from tampering including the version of the CDM, the integrity being determined by the version of the CDM; and
- when it is determined that no information is received from the client device indicating the client device supports at least the version of the CDM:
  - using trust relationships established between the network device and a plurality of different CDM providers to access respective public keys associated with CDMs from the plurality of different CDM providers,
  - encrypting the license/decryption key with each of the accessed public keys to generate a plurality of encrypted licenses/decryption keys, and
  - providing each of the encrypted licenses/decryption keys to the client device.

15. The apparatus of claim 14, wherein sending each of the plurality of encrypted licenses/decryption keys to the client device, further comprises wherein at least one other CDM in the plurality of CDMs is selected by the client device to decrypt an one of the plurality encrypted licenses/decryption keys using a private key associated with a corresponding public key for the other CDM.

16. The apparatus of claim 14, wherein the operations further comprise:
- querying the client device to determine which of a plurality of CDMs the client device supports; and
- wherein providing each of the encrypted licenses/decryption keys to the client device, further comprises the client device selects which CDM to employ to decrypt one of the plurality of encrypted licenses/decryption keys to enable access to the media content.

17. The apparatus of claim 14, wherein the operations further comprise:
- receiving from the client device, information indicating that the client device supports another CDM;
- determining that a trust relationship is established for the supported other CDM;
- based on the results of the determination of the trust relationship for the supported other CDM, encrypting the license/decryption key using another public key associated with the other CDM; and
- determining that a trust relationship is not established for at least one other CDM provider for another CDM; and
- based on the determination of no established trust relationship, refusing to employ another public key associated with the other CDM provider to encrypt and send to the client device the license/decryption key;
- sending to the client device the license/decryption key encrypted with the other public key, wherein the client device selects which CDM to employ to decrypt the encrypted license/decryption key.

18. The apparatus of claim 14, wherein the operations further comprise:
- receiving information indicating that at least one of a public key is compromised, an integrity of at least one component of the client device is compromised, and based on the received information refusing to use the compromised public key, or to send the license/decryption key to the compromised client device.

19. The apparatus of claim 14, wherein establishing the trust relationship comprises receiving at least one attestation from a third-party indicating a level of quality of the CDM provider or version of the CDM.

20. The apparatus of claim 14, wherein the trust relationship is based at least in part on a contract agreement between a content provider and the CDM provider.

* * * * *